(12) United States Patent
Myslinski

(10) Patent No.: US 9,990,357 B2
(45) Date of Patent: *Jun. 5, 2018

(54) OPTIMIZED SUMMARIZING AND FACT CHECKING METHOD AND SYSTEM

(71) Applicant: Lucas J. Myslinski, Sunnyvale, CA (US)

(72) Inventor: Lucas J. Myslinski, Sunnyvale, CA (US)

(*) Notice: Subject to any disclaimer, the term of this patent is extended or adjusted under 35 U.S.C. 154(b) by 483 days.

This patent is subject to a terminal disclaimer.

(21) Appl. No.: 14/701,757

(22) Filed: May 1, 2015

(65) Prior Publication Data

US 2016/0070785 A1    Mar. 10, 2016

Related U.S. Application Data

(63) Continuation of application No. 14/477,009, filed on Sep. 4, 2014, now Pat. No. 9,189,514.

(51) Int. Cl.
*G06F 17/30* (2006.01)
*G06F 17/27* (2006.01)
(Continued)

(52) U.S. Cl.
CPC .............. *G06F 17/277* (2013.01); *G06F 7/24* (2013.01); *G06F 17/27* (2013.01); *G06F 17/2725* (2013.01); *G06F 17/2785* (2013.01); *G06F 17/28* (2013.01); *G06F 17/289* (2013.01); *G06F 17/30371* (2013.01); *G06F 17/30412* (2013.01); *G06F 17/30657* (2013.01); *G06F 17/30663* (2013.01); *G06F 17/30699* (2013.01); *G06F 17/30719* (2013.01); *G06F 17/30867* (2013.01); *G06F 17/30976* (2013.01); *G06Q 30/0255* (2013.01); *G06Q 50/01* (2013.01); *H04L 67/22* (2013.01); *G06F 3/04842* (2013.01)

(58) Field of Classification Search
CPC ................................................. G06F 17/30023
See application file for complete search history.

(56) References Cited

U.S. PATENT DOCUMENTS 5,960,411 A    9/1999    Hartman et al.
6,161,090 A    12/2000   Kanevsky et al.
(Continued)

FOREIGN PATENT DOCUMENTS

GB        2428529 A       1/2007
WO        2001077906 A2   10/2001
(Continued)

OTHER PUBLICATIONS

Office Action from U.S. Appl. No. 14/713,087.
(Continued)

*Primary Examiner* — Grace Park
(74) *Attorney, Agent, or Firm* — Haverstock & Owens LLP

(57) ABSTRACT

An optimized fact checking system analyzes and determines the factual accuracy of information and/or characterizes the information by comparing the information with source information. The optimized fact checking system automatically monitors information, processes the information, fact checks the information in an optimized manner and/or provides a status of the information. In some embodiments, the optimized fact checking system generates, aggregates, and/or summarizes content.

20 Claims, 11 Drawing Sheets

(51) Int. Cl.
  *G06F 7/24*      (2006.01)
  *G06F 17/28*     (2006.01)
  *G06Q 30/02*     (2012.01)
  *G06Q 50/00*     (2012.01)
  *H04L 29/08*     (2006.01)
  *G06F 3/0484*    (2013.01)

(56) References Cited

U.S. PATENT DOCUMENTS

| | | | |
|---|---|---|---|
| 6,256,734 | B1 | 7/2001 | Blaze et al. |
| 6,266,664 | B1 | 7/2001 | Russell-Falla et al. |
| 6,278,967 | B1 | 8/2001 | Akers |
| 6,460,036 | B1 | 10/2002 | Herz |
| 6,694,482 | B1* | 2/2004 | Arellano ........... G06F 17/30017 707/E17.009 |
| 6,782,510 | B1 | 8/2004 | Gross et al. |
| 7,249,058 | B2 | 7/2007 | Kim et al. |
| 7,249,380 | B2 | 7/2007 | Yang |
| 7,266,116 | B2 | 9/2007 | Halpern |
| 7,337,462 | B2 | 2/2008 | Dudkiewicz et al. |
| 7,478,078 | B2 | 1/2009 | Lunt et al. |
| 7,483,871 | B2 | 1/2009 | Herz |
| 7,487,334 | B2 | 2/2009 | Konigsburg et al. |
| 7,644,088 | B2 | 1/2010 | Fawcett et al. |
| 7,657,424 | B2 | 2/2010 | Bennett |
| 7,765,574 | B1 | 7/2010 | Maybury et al. |
| 7,809,721 | B2 | 10/2010 | Putivsky et al. |
| 8,115,869 | B2 | 2/2012 | Rathod et al. |
| 8,185,448 | B1 | 5/2012 | Myslinski |
| 8,209,724 | B2 | 6/2012 | Rathod et al. |
| 8,225,164 | B2 | 7/2012 | Westerlund et al. |
| 8,229,795 | B1 | 7/2012 | Myslinski |
| 8,290,924 | B2 | 10/2012 | Rajaram |
| 8,290,960 | B2 | 10/2012 | Li et al. |
| 8,321,295 | B1 | 11/2012 | Myslinski |
| 8,401,919 | B2 | 3/2013 | Myslinski |
| 8,423,424 | B2 | 4/2013 | Myslinski |
| 8,458,046 | B2 | 6/2013 | Myslinski |
| 8,510,173 | B2 | 8/2013 | Myslinski |
| 8,540,574 | B1 | 9/2013 | Kopra |
| 8,583,509 | B1 | 11/2013 | Myslinski |
| 8,589,373 | B2 | 11/2013 | Mayer |
| 8,676,567 | B2 | 3/2014 | Hollingsworth |
| 9,300,755 | B2 | 3/2016 | Gerke |
| 2002/0083468 | A1 | 6/2002 | Dudkiewicz |
| 2002/0099730 | A1 | 7/2002 | Brown et al. |
| 2003/0088689 | A1 | 5/2003 | Alexander, Jr. et al. |
| 2003/0158872 | A1 | 8/2003 | Adams |
| 2003/0210249 | A1 | 11/2003 | Simske |
| 2004/0103032 | A1 | 5/2004 | Maggio |
| 2004/0122846 | A1 | 6/2004 | Chess et al. |
| 2004/0139077 | A1 | 7/2004 | Banker |
| 2004/0210824 | A1 | 10/2004 | Shoff et al. |
| 2005/0022252 | A1 | 1/2005 | Shen |
| 2005/0060312 | A1 | 3/2005 | Curtiss et al. |
| 2005/0120391 | A1 | 6/2005 | Haynie et al. |
| 2005/0132420 | A1 | 6/2005 | Howard et al. |
| 2005/0182628 | A1 | 8/2005 | Choi |
| 2005/0235199 | A1 | 10/2005 | Adams |
| 2006/0015904 | A1 | 1/2006 | Marcus |
| 2006/0064633 | A1 | 3/2006 | Adams |
| 2006/0148446 | A1 | 7/2006 | Karlsson |
| 2006/0206912 | A1 | 9/2006 | Klarfeld et al. |
| 2006/0212904 | A1 | 9/2006 | Klarfeld et al. |
| 2006/0248076 | A1 | 11/2006 | Troy et al. |
| 2006/0253580 | A1 | 11/2006 | Dixon et al. |
| 2006/0293879 | A1 | 12/2006 | Zhao et al. |
| 2007/0011710 | A1 | 1/2007 | Chiu |
| 2007/0043766 | A1 | 2/2007 | Nicholas et al. |
| 2007/0100730 | A1 | 5/2007 | Batashvili et al. |
| 2007/0136781 | A1 | 6/2007 | Kawai |
| 2007/0136782 | A1 | 6/2007 | Ramaswamy et al. |
| 2007/0179821 | A1* | 8/2007 | Poetsch ................ G06F 8/10 705/7.27 |
| 2007/0288978 | A1 | 12/2007 | Pizzurro et al. |
| 2008/0077570 | A1 | 3/2008 | Tang et al. |
| 2008/0104506 | A1 | 5/2008 | Farzindar |
| 2008/0109285 | A1 | 5/2008 | Reuther et al. |
| 2008/0109780 | A1 | 5/2008 | Stern et al. |
| 2008/0183726 | A1 | 7/2008 | Bruckner et al. |
| 2008/0319744 | A1 | 12/2008 | Goldberg |
| 2009/0063294 | A1 | 3/2009 | Hoekstra et al. |
| 2009/0125382 | A1 | 5/2009 | Delepet |
| 2009/0210395 | A1 | 8/2009 | Sedam |
| 2009/0265304 | A1 | 10/2009 | Ait-Mokhtar et al. |
| 2009/0311659 | A1 | 12/2009 | Lottridge et al. |
| 2010/0023525 | A1 | 1/2010 | Westerlund et al. |
| 2010/0049590 | A1 | 2/2010 | Anshul |
| 2010/0121638 | A1 | 5/2010 | Pinson et al. |
| 2010/0121973 | A1 | 5/2010 | Lobacheva et al. |
| 2010/0235313 | A1 | 9/2010 | Rea et al. |
| 2010/0306166 | A1 | 12/2010 | Pantel et al. |
| 2010/0332583 | A1 | 12/2010 | Szabo |
| 2011/0043652 | A1 | 2/2011 | King et al. |
| 2011/0066587 | A1 | 3/2011 | Ferrucci et al. |
| 2011/0067065 | A1 | 3/2011 | Karaoguz et al. |
| 2011/0087639 | A1 | 4/2011 | Gurney |
| 2011/0093258 | A1 | 4/2011 | Xu et al. |
| 2011/0106615 | A1 | 5/2011 | Churchill et al. |
| 2011/0107200 | A1 | 5/2011 | Rogers |
| 2011/0136542 | A1 | 6/2011 | Sathish |
| 2011/0166860 | A1 | 7/2011 | Tran |
| 2011/0313757 | A1 | 12/2011 | Hoover et al. |
| 2012/0005221 | A1 | 1/2012 | Ickman et al. |
| 2012/0102405 | A1 | 4/2012 | Zuckerman et al. |
| 2012/0131015 | A1 | 5/2012 | Al Badrashiny et al. |
| 2012/0158711 | A1 | 6/2012 | Curtiss et al. |
| 2012/0191757 | A1 | 7/2012 | Gross et al. |
| 2012/0198319 | A1 | 8/2012 | Agnoli et al. |
| 2012/0272143 | A1 | 10/2012 | Gillick |
| 2012/0317046 | A1 | 12/2012 | Myslinski |
| 2013/0060757 | A1 | 3/2013 | Myslinski |
| 2013/0074110 | A1* | 3/2013 | Myslinski ............... G06Q 10/10 725/14 |
| 2013/0091436 | A1 | 4/2013 | Rose et al. |
| 2013/0099925 | A1 | 4/2013 | Pederson |
| 2013/0110748 | A1 | 5/2013 | Talati et al. |
| 2013/0151240 | A1 | 6/2013 | Myslinski |
| 2013/0158984 | A1 | 6/2013 | Myslinski |
| 2013/0159127 | A1 | 6/2013 | Myslinski |
| 2013/0191298 | A1 | 7/2013 | Myslinski |
| 2013/0191392 | A1 | 7/2013 | Kumar |
| 2013/0198196 | A1 | 8/2013 | Myslinski |
| 2013/0308920 | A1 | 11/2013 | Myslinski |
| 2013/0311388 | A1 | 11/2013 | Myslinski |
| 2013/0343729 | A1 | 12/2013 | Rav-Acha et al. |
| 2013/0346160 | A1 | 12/2013 | Dunst |
| 2014/0074751 | A1 | 3/2014 | Rocklitz |

FOREIGN PATENT DOCUMENTS

| | | |
|---|---|---|
| WO | 2001077907 A2 | 10/2001 |
| WO | 2003014949 A1 | 2/2003 |
| WO | 2004034755 A2 | 4/2004 |
| WO | 2006036853 A2 | 6/2006 |
| WO | 2007115224 A2 | 10/2007 |
| WO | 2009006542 A2 | 1/2009 |
| WO | 2009089116 | 7/2009 |
| WO | 2010093510 A1 | 8/2010 |
| WO | 2010105245 A2 | 9/2010 |
| WO | 2011088264 A1 | 7/2011 |
| WO | 2015/044179 | 4/2015 |

OTHER PUBLICATIONS

Office Action from U.S. Appl. No. 14/713,096.
Office Action from U.S. Appl. No. 15/261,100.
Ryosuke Nagura et al: "A method of rating the credibility of news documents on the web,"Proceedings of the 29th Annual International ACM SIGIR Conference on Research and Development in Information Retrieval, SIGIR '06, Aug. 6, 2006, p. 683.

(56) References Cited

OTHER PUBLICATIONS

Andreas Juffinger et al.: "Blog credibility ranking by exploiting verified content," Proceedings of the 3rd Workshop on Information Credibility on the Web, WICOW '09, Apr. 20, 2009 (Apr. 20, 2009), p. 51.
Ulken, A Question of Balance: Are Google News search results politically biased? May 5, 2005, <http://ulken.com/thesis/googlenews-bias-study.pdf>.
<http://jayrosen.posterous.com/my-simple-fix-for-the-messed-up-sunday-shows> (Dec. 27, 2009).
<http://en.wikipedia.org/wiki/SpinSpotter> (Jul. 1, 2010).
Notice of Allowance including reasons for allowance from U.S. Appl. No. 13/287,804.
Accelerated Examination Support Document from U.S. Appl. No. 13/287,804.
Preexam Search Document from U.S. Appl. No. 13/287,804.
Wendell Cochran; Journalists aren't frauds; the business has fine lines; Ethics classes would help them stay on right side; The Sun. Baltimore, MD.: Jul 19, 1998. p. 6.C; http://proquest.umi.com/pqdweb?did=32341381&sid=3&Fmt=3&clientId=19649&RQT=309&VName=PQD.
Notice of Allowance including reasons for allowance from U.S. Appl. No. 13/448,991.
Notice of Allowance including reasons for allowance from U.S. Appl. No. 13/528,563.
Notice of Allowance including reasons for allowance from U.S. Appl. No. 13/632,490.
Notice of Allowance including reasons for allowance from U.S. Appl. No. 13/669,711.
Notice of Allowance including reasons for allowance from U.S. Appl. No. 13/669,819.
Office Action from U.S. Appl. No. 13/669,711.
Office Action from U.S. Appl. No. 13/669,819.
Notice of Allowance including reasons for allowance from U.S. Appl. No. 13/760,408.
Notice of Allowance including reasons for allowance from U.S. Appl. No. 13/946,333.
Office Action from U.S. Appl. No. 13/946,333.
Sorry for the Spam, Truth Goggles, <http://slifty.com/projects/truth-goggles/>, Oct. 29, 2012.
LazyTruth Chrome extension fact checks chain emails, <http://www.theverge.com/2012/11/14/3646294/lazytruth-fact-check-chain-email>, Nov. 14, 2012.
Announcing Truth Teller beta, a better way to watch political speech, <http://www.washingtonpost.com/blogs/ask-the-post/wp/2013/09/25/announcing-truth-teller-beta-a-better-way-to-watch-political-speech/>, Sep. 25, 2013.
Fact Check Your News with the Trooclick App, <http://semanticweb.com/fact-check-news-trooclick-app_b43262>, Jun. 18, 2014.
Office Action from U.S. Appl. No. 14/260,492.
Notice of Allowance including reasons for allowance from U.S. Appl. No. 13/203,899.
Barzilay et al., Using Lexical Chains for Text Summarization, Mathematics and Computer Science Dept., Ben Gurion University in the Negev, Isreal, <http://research.microsoft.com/en-us/um/people/cyl/download/papers/lexical-chains.pdf>, accessed Jul. 11, 2014, In Proceedings of the ACL '97/EACL '97 Workshop on Intelligent Scalable Text Summarization, 1997.
Gonzalez et al., A New Lexical Chain Algorithm Used for Automatic Summarization, TALP Research Center, Spain, <http://www.lsi.upc.edu/~mfuentes/cgi-bin/articles_presentacions/Ccia09.pdf>, accessed Jul. 11, 2014.
Lexical Chains, <http://www.csi.ucd.ie/Staff/jcarthy/home/Lex.html>, accessed Jul. 11, 2014.
Lexalytics, Inc., Lexical Chaining, <http://www.lexalytics.com/lexical-chaining>, accessed Jul. 11, 2014.
This Artificial Intelligence Company Could 'Eradicate the Spreadsheet' and Do the Work of a $250,000 Consultant, <http://www.businessinsider.com/narrative-science-2014-7>, Jul. 7, 2014.
Who's Afraid of Robot Journalists, <https://www.yahoo.com/tech/whos-afraid-of-robot-journalists-91182873564.html> Jul. 9, 2014.
News aggregator, <http://en.wikipedia.org/wiki/News_aggregator>, Sep. 1, 2014.
Office Action from U.S. Appl. No. 14/477,009.
Notice of Allowance including reasons for allowance from U.S. Appl. No. 14/477,009.
Final Office Action from U.S. Appl. No. 14/713,087.

* cited by examiner

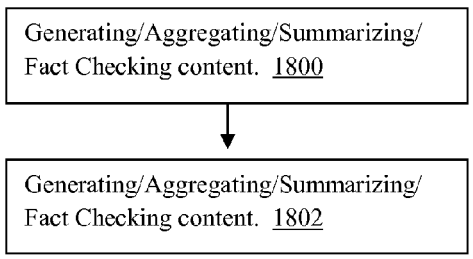
Fig. 18
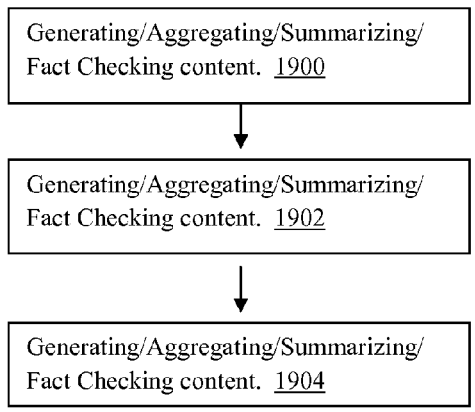
Fig. 19
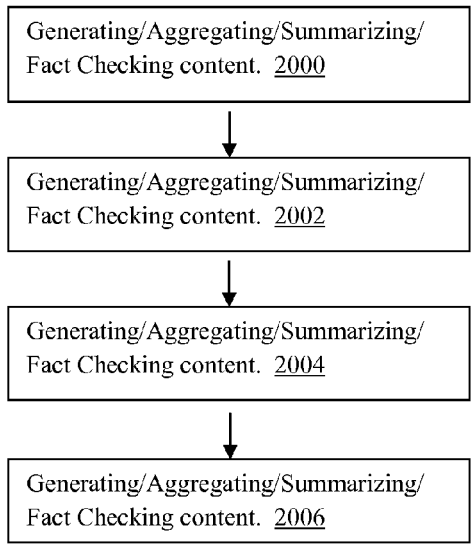
Fig. 20
| Generating | Aggregating | Merging | Summarizing |
|---|---|---|---|
| Opposing Perspective | Validity Rating | Satisfaction Rating | Replay |
| Breaking News | Language Differences | Advertising | User Interests |
| Cloud Computing | Augmented Reality | Search | Other Implementations |
Fig. 21

OPTIMIZED SUMMARIZING AND FACT CHECKING METHOD AND SYSTEM

CROSS-REFERENCE TO RELATED APPLICATION(S)

This application is a continuation application of co-pending U.S. patent application Ser. No. 14/477,009, filed on Sep. 4, 2014, and titled "OPTIMIZED FACT CHECKING METHOD AND SYSTEM," which is hereby incorporated by reference in its entirety for all purposes.

FIELD OF THE INVENTION

The present invention relates to the field of information analysis. More specifically, the present invention relates to the field of automatically verifying the factual accuracy of information.

BACKGROUND OF THE INVENTION

Information is easily dispersed through the Internet, television, social media and many other outlets. The accuracy of the information is often questionable or even incorrect. Although there are many fact checkers, they typically suffer from issues.

SUMMARY OF THE INVENTION

An optimized fact checking system analyzes and determines the factual accuracy of information and/or characterizes the information by comparing the information with source information. The optimized fact checking system automatically monitors information, processes the information, fact checks the information in an optimized manner and/or provides a status of the information.

The optimized fact checking system provides users with factually accurate information, limits the spread of misleading or incorrect information, provides additional revenue streams, and supports many other advantages.

BRIEF DESCRIPTION OF THE DRAWINGS

FIG. 18 illustrates a flowchart of a method of generating, aggregating, summarizing and/or fact checking content according to some embodiments.

FIG. 19 illustrates a flowchart of a method of generating, aggregating, summarizing and/or fact checking content according to some embodiments.

FIG. 20 illustrates a flowchart of a method of generating, aggregating, summarizing and/or fact checking content according to some embodiments.

FIG. 21 illustrates a diagram of exemplary implementations usable with or without optimized fact checking according to some embodiments.

DETAILED DESCRIPTION OF THE PREFERRED EMBODIMENT

An optimized fact checking system determines the factual accuracy of information by comparing the information with source information. Additional analysis is able to be implemented as well such as summarizing the information, aggregating information and generating information.

Figure 1:
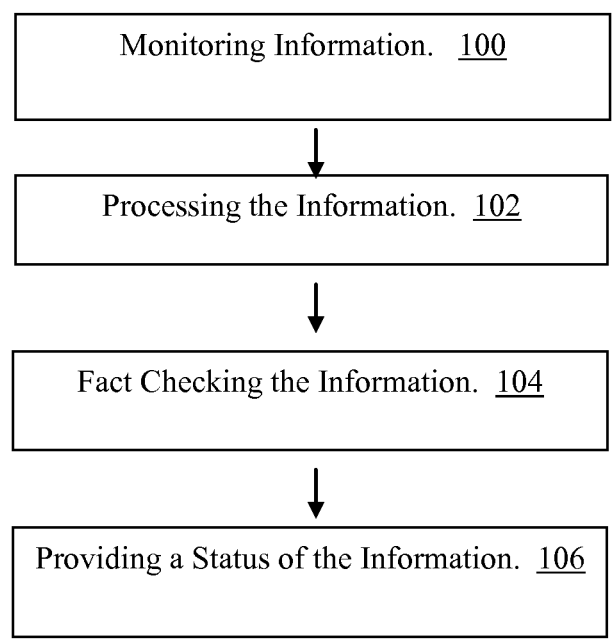
FIG. 1 illustrates a flowchart of a method of implementing optimized fact checking according to some embodiments.

FIG. 1 illustrates a flowchart of a method of implementing optimized fact checking according to some embodiments.

In the step 100, information is monitored. In some embodiments, all information or only some information (e.g., a subset less than all of the information) is monitored. In some embodiments, only explicitly selected information is monitored. In some embodiments, although all information is monitored, only some information (e.g., information deemed to be fact-based) is fact checked. In some embodiments, the step of monitoring is skipped.

The information includes, but is not limited to, broadcast information (e.g., television broadcast information, radio broadcast information), email, documents, articles, news reports, database information, social networking/media content (tweets/Twitter®, Facebook® postings), webpages, message boards, web logs, any computing device communication, telephone calls/communications, audio, text, live speeches/audio, radio, television video/text/audio, VoIP calls, video chatting, video conferencing, images, videos, and/or any other information. The information is able to be in the form of phrases, segments, sentences, numbers, words, comments, values, graphics, and/or any other form.

In some embodiments, monitoring includes recording, scanning, capturing, transmitting, tracking, collecting, surveying, and/or any other type of monitoring. In some embodiments, monitoring includes determining if a portion of the information is able to be fact checked. For example, if information has a specified structure, then it is able to be fact checked.

In some embodiments, the optimized fact checking system is implemented without monitoring information. This is able to be implemented in any manner. For example, while information is transmitted from a source, the information is also processed and fact checked so that the fact check result is able to be presented. In some embodiments, the fact check result is embedded in the same stream as the information. In some embodiments, the fact check result is in the header of a packet.

In the step 102, the information is processed. Processing is able to include many aspects including, but not limited to, converting (e.g., audio into text), formatting, parsing, determining context, transmitting, converting an image into text, analyzing and reconfiguring, and/or any other aspect that enables the information to be fact checked in an optimized manner. Parsing, for example, includes separating a long speech into separate phrases that are each separately fact checked. For example, a speech may include 100 different facts that should be separately fact checked. In some embodiments, the step 102 is able to be skipped if processing is not necessary (e.g., text may not need to be processed). In some embodiments, processing includes converting the information into a searchable format. In some embodiments, processing occurs concurrently with monitoring. In some embodiments, processing includes capturing/receiving and/or transmitting the information (e.g., to/from the cloud).

In a specific example of processing, information is converted into searchable information (e.g., audio is converted into searchable text), and then the searchable information is parsed into fact checkable portions (e.g., segments of the searchable text; several word phrases).

Parsing is able to be implemented in any manner including, but not limited to, based on sentence structure (e.g., subject/verb determination), based on punctuation including, but not limited to, end punctuation of each sentence (e.g., period, question mark, exclamation point), intermediate punctuation such as commas and semi-colons, based on other grammatical features such as conjunctions, based on capital letters, based on a duration of a pause between words (e.g., 2 seconds), based on duration of a pause between words by comparison (e.g., typical pauses between words for user are 0.25 seconds and pauses between thoughts are 1 second)—the user's speech is able to be analyzed to determine speech patterns such as length of pauses between words lasting a fourth of the length for pauses between thoughts or sentences, based on a change of a speaker (e.g., speaker A is talking, then speaker B starts talking), based on a word count (e.g., 10 word segments), based on speech analysis, based on a slowed down version (recording the content, slowing down the recorded content to determine timing breaks), based on keywords/key phrases, based on search results, and/or any other manner. In some embodiments, processing includes, but is not limited to, calculating, computing, storing, recognition, speaker recognition, language (word, phrase, sentence, other) recognition, labeling, and/or characterizing.

In the step 104, the information is fact checked in an optimized manner. In some embodiments, instead of or in addition to fact checking, methods such as generating, aggregating, and/or summarizing are implemented. Fact checking includes comparing the information to source information to determine the factual validity, accuracy, quality, character and/or type of the information. In some embodiments, the source information includes web pages on the Internet, one or more databases, dictionaries, encyclopedias, social network information, video, audio, any other communication, any other data, one or more data stores and/or any other source.

In some embodiments, the comparison is a text comparison such as a straight word for word text comparison. In some embodiments, the comparison is a context/contextual comparison. In some embodiments, a natural language comparison is used. In some embodiments, pattern matching is utilized. In some embodiments, an intelligent comparison is implemented to perform the fact check. In some embodiments, exact match, pattern matching, natural language, intelligence, context, and/or any combination thereof is used for the comparison. Any method of analyzing the source information and/or comparing the information to the source information to analyze and/or characterize the information is able to be implemented. An exemplary implementation of fact checking includes searching (e.g., a search engine's search), parsing the results or searching through the results of the search, comparing the results with the information to be checked using one or more of the comparisons (e.g., straight text, context or intelligent) and retrieving results based on the comparison (e.g., if a match is found return "True"). The comparison is able to involve comparing a text string found in the target information with source information to determine if a match is found, or comparing a pattern of content with patterns in source content, or any other implementation. The results are able to be any type including, but not limited to, binary, Boolean (True/False), text, numerical, and/or any other format. In some embodiments, determining context and/or other aspects of converting could be implemented in the step 104. In some embodiments, the comparison for fact checking includes determining if a source agrees with (or confirms) or disagrees with (or disproves) the target information, and then the number of agreeing sources is compared with the number of disagree sources. For example, if 10 sources agree and 5 disagree with the target information, then the result of the fact check is true. In some embodiments, a source is considered to agree if the searched for content is found in the source (e.g., a match is found), and a source is considered to disagree if the searched for content is not found in the source or if an opposite content is found (e.g., same search string but with a "not" in front of it). In some embodiments, fact checking utilizes previously fact checked sources (fact checked manually and/or automatically), and information (e.g., segments, phrases, sentences) from the sources is classified as accurate or factually inaccurate, then information being fact checked is compared with the classified source information, and if a match is found in a classification, then the value of that classification is returned, and if a match is not found, then a result such as "unknown" is returned. For example, "X was the president during the war" is fact checked, and the phrase is found in the factually inaccurate classification, so a result of false or factually inaccurate is returned. In another example of fact checking, a set of data is collected/established. In some embodiments, the collected data is limited to fact checked data or data where the inaccurate content has been removed or classified separately. Then, any one of the searches (e.g., exact, text, pattern, intelligent) is used to find a match in the collected source data, and if the number of matches is above a threshold, a result of true is returned, otherwise, false is returned. A confidence score is able to be generated in any manner; for example, a confidence score is based on the number of sources that agree or disagree with the information—10 sources agree/match with the information and 0 disagree=100% confidence score or 9 sources agree with the information and 1 disagrees=90% confidence score. In some embodiments, the sources are rated and/or weighted. For example, sources are able to be given more weight based on accuracy of the source, type of the source, user preference, user selections, classification of the source, and/or any other weighting factor. The weighting is then able to be used in determining the fact check result. For example, if a highly weighted or rated source agrees with a comment, and a low weighted source disagrees with the comment, the higher weighted source is used, and "valid" or a similar result is returned.

For example, if information is being fact checked using comparison, the comparisons may result in sets of results (e.g., two different sets of results are found—a first set determines the information is true, and the second set determines the information is false), the set with the higher rated sources or source score is selected. A sample equation is:

Comparison Score=Number of Sources*Average Rating of Sources, where the comparison with highest Comparison Score determines the verification result. For example, "Corporation Z is a polluter," results in 100 sources with an average rating of 8 (where 1 is untrustworthy and 10 is very trustworthy) saying "True," and 5 sources with an average rating of 3 saying "False," the result would be "True" since (100*8)=800 is greater than (5*3)=15.

In the step 106, a status of the information is provided/presented/displayed based on the fact check result. The status is provided in any manner including, but not limited to, transmitting and/or displaying text, highlighting, underlining, color effects, a visual or audible alert or alarm, a graphical representation, and/or any other indication. The meaning of the status is able to be any meaning including, but not limited to, correct, incorrect, valid, true, false, invalid, opinion, hyperbole, sarcasm, hypocritical, comedy, unknown, questionable, suspicious, need more information, depends, misleading, deceptive, possibly, close to the truth, and/or any other status.

The status is able to be presented in any manner, including, but not limited to, lights, audio/sounds, highlighting, text, a text bubble, a scrolling text, color gradient, headnotes/footnotes, an iconic or graphical representation, a video or video clip, music, other visual or audio indicators, a projection, a hologram, a tactile indicator including, but not limited to, vibrations, an olfactory indicator, a Tweet, a text message (SMS, MMS), an email, a page, a phone call, a social networking page/transmission/post/content, or any combination thereof. For example, text is able to be highlighted or the text color is able to change based on the validity of the text. For example, as a user types a social network message, the true statements are displayed in green, the questionable statements are displayed in yellow, and the false statements are displayed in red. In some embodiments, providing the status includes transmitting and/or broadcasting the status to one or more devices (e.g., televisions). In another example, a web page and/or social networking content includes markings such as strikethrough or highlighting and text embedded/overlaid, so that the user is able to read a webpage with the fact check results displayed.

The status is also able to include other information including, but not limited to, statistics, citations and/or quotes. Providing the status of the information is also able to include providing additional information related to the fact checked information, such as an advertisement. In some embodiments, providing includes pointing out, showing, displaying, recommending, playing, presenting, announcing, arguing, convincing, signaling, asserting, persuading, demonstrating, denoting, expressing, hinting, illustrating, implying, tagging, labeling, characterizing, and/or revealing.

In some embodiments, the optimized fact checking system is implemented such that responses, validity determinations and/or status presentations are available in real-time or near real-time. By real-time, it is meant instantaneously (e.g., within 1 second); whereas near real-time is within a few seconds (e.g., within 5 seconds). Furthermore, since the monitoring, processing, fact checking and providing status are all able to be performed automatically without user intervention, real-time also means faster than having a human perform the search and presenting results. Depending on the implementation, in some embodiments, the fact check result, summary, generated story, aggregation, and/or other information is presented in at most 1 second, at most several seconds (e.g., at most 5 seconds), at most a minute (not real-time), at most several minutes or by the end of a show/content. In some embodiments, the time amount (e.g., at most 1 second) begins once a user pauses in typing, once a phrase has been communicated, once a phrase has been determined, at the end of a sentence, once an item is flagged, or another point in a sequence. For example, as soon as a phrase is detected, the optimized fact checking system checks the fact, returns a result and displays an indication based on the result in less than 1 second—clearly much faster than a human performing a search, analyzing the search results and then typing a result to be displayed on a screen.

In some embodiments, fewer or more steps are implemented. Furthermore, in some embodiments, the order of the steps is modified. In some embodiments, the steps are performed on the same device, and in some embodiments, one or more of the steps, or parts of the steps, are separately performed and/or performed on separate devices. In some embodiments, each of the steps 100, 102, 104 and 106 occur or are able to occur in real-time or non-real-time. Any combination of real-time and non-real-time steps is possible such as all real-time, none real-time and everything in between.

Figure 2:
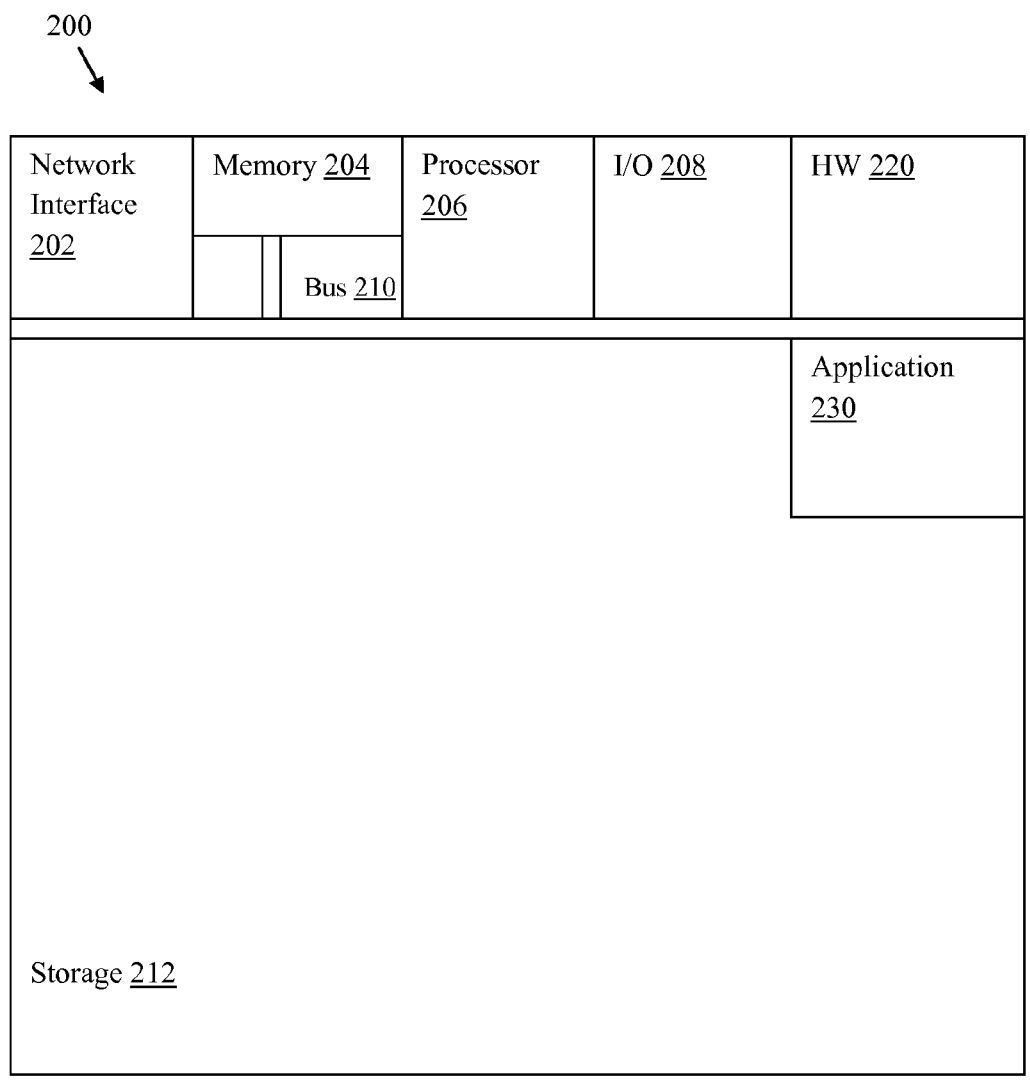
FIG. 2 illustrates a block diagram of an exemplary computing device configured to implement the optimized fact checking method according to some embodiments.

FIG. 2 illustrates a block diagram of an exemplary computing device 200 configured to implement the optimized fact checking method according to some embodiments. The computing device 200 is able to be used to acquire, store, compute, process, communicate and/or display information including, but not limited to, text, images, videos and audio. In some examples, the computing device 200 is able to be used to monitor information, process the information, fact check the information, generate, aggregate, summarize, and/or provide a status of the information. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card, solid state drive or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, touchpad, speaker/microphone, voice input device, button interface, hand-waving, body-motion capture, touchless 3D input, joystick, remote control, brain-computer interface/direct neural interface/brain-machine interface, camera, and other devices. In some embodiments, the hardware structure includes multiple processors and other hardware to perform parallel processing. Fact checking application(s) 230 used to perform the monitoring, processing, fact checking and providing are likely to be stored in the storage device 212 and memory 204 and processed as applications are typically processed. More or fewer components shown in FIG. 2 are able to be included in the computing device 200. In some embodiments, fact checking hardware 220 is included. Although the computing device 200 in FIG. 2 includes applications 230 and hardware 220 for implementing the fact checking, the fact checking method is able to be implemented on a computing device in hardware, firmware, software or any combination thereof. For example, in some embodiments, the fact checking applications 230 are programmed in a memory and executed using a processor. In another example, in some embodiments, the fact checking hardware 220 is programmed hardware logic including gates specifically designed to implement the method.

In some embodiments, the fact checking application(s) 230 include several applications and/or modules. Modules include a monitoring module for monitoring information, a processing module for processing (e.g., converting) information, a generating module for generating a story or other information, an aggregating module for aggregating information, a summarizing module for summarizing information, a fact checking module for fact checking information and a providing module for providing a status of the information. In some embodiments, modules include one or more sub-modules as well. In some embodiments, fewer or additional modules are able to be included. In some embodiments, the applications and/or the modules are located on different devices. For example, a device performs monitoring, processing, and fact checking, but the providing is performed on a different device, or in another example, the monitoring and processing occurs on a first device, the generating, aggregating, summarizing and/or fact checking occurs on a second device and the providing occurs on a third device. Any configuration of where the applications/modules are located is able to be implemented such that the fact checking system is executed.

Examples of suitable computing devices include, but are not limited to a personal computer, a laptop computer, a computer workstation, a server, a mainframe computer, a handheld computer, a personal digital assistant, a pager, a telephone, a fax machine, a cellular/mobile telephone, a smart appliance, a gaming console, a digital camera, a digital camcorder, a camera phone, a smart phone/device (e.g., a Droid® or an iPhone®), a portable music player (e.g., an iPod®), a tablet (e.g., an iPad®), a video player, an e-reader (e.g., Kindle™), a DVD writer/player, an HD (e.g., Blu-ray®) or ultra high density writer/player, a television, a copy machine, a scanner, a car stereo, a stereo, a satellite, a DVR (e.g., TiVo®), a smart watch/jewelry, smart devices, a home entertainment system or any other suitable computing device.

In some embodiments, the systems described herein are implemented using a device with specialized components such as a specialized fact checking microprocessor configured to fact check content, a specialized news generation microprocessor configured to generate stories, and/or a specialized summarization microprocessor with self-contained lexical chaining resources such as a synonym database. In some embodiments, the systems described herein are implemented using a device with specialized components such as a specialized fact checking memory configured to store fact check sources and/or results, a specialized news generation memory configured to store content for generating stories, and/or a specialized summarization memory configured to store self-contained lexical chaining resources such as a synonym database.

In another example, a camera phone device is configured for implementing the methods described herein. The camera phone device includes a sensor for acquiring content (e.g., photos/videos), an image processor configured for processing the image content, and a memory for storing the image content. Additionally, the camera phone device includes a processor and additional memory for processing and storing content including fact checking, summarizing, aggregating, and/or generating content. Although the device described is a camera phone, any device with a camera (e.g., a tablet, smart watch) is able to be utilized. In an exemplary implementation, the camera device captures an image, processes, displays the image is on a display, additionally, generating, aggregating, summarizing and/or fact checking are implemented on the camera device using either the captured image or other content.

In another example, a device is configured to couple with a camera device. For example, the device is a computing device with a USB port which is able to receive a cable which couples to a video/camera/webcam device. In some embodiments, a device includes a camera device or is configured to couple with a camera device.

Figure 3:
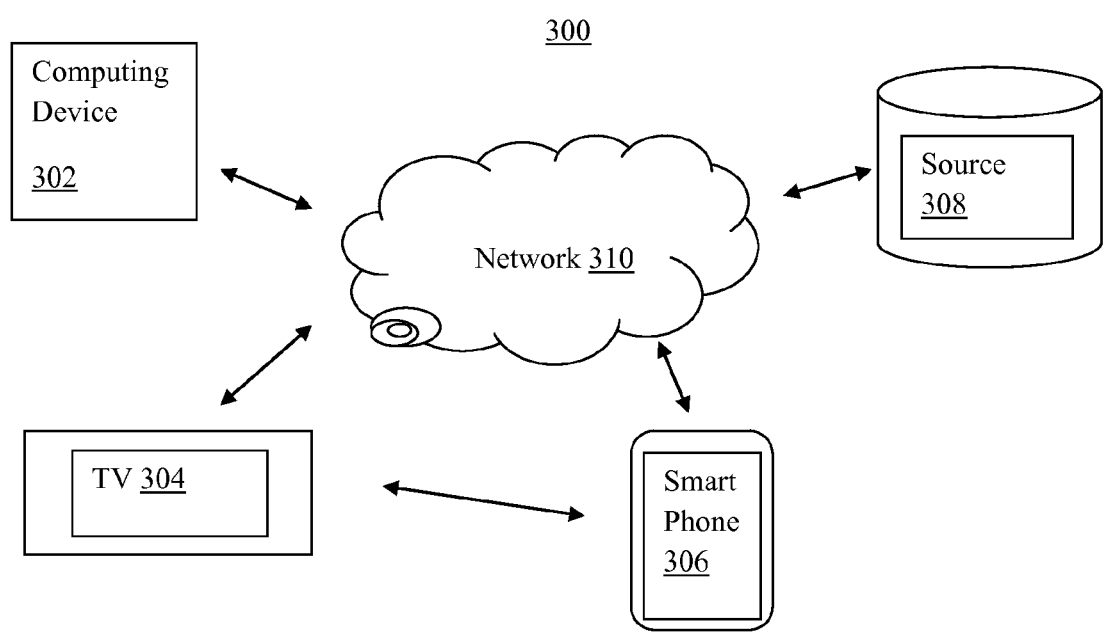
FIG. 3 illustrates a network of devices configured to implement fact checking according to some embodiments.

FIG. 3 illustrates a network of devices configured to implement fact checking according to some embodiments. The network of devices 300 is able to include any number of devices and any various devices including, but not limited to, a computing device (e.g., a tablet) 302, a television 304, a smart device 306 (e.g., a smart phone) and a source 308 (e.g., a database) coupled through a network 310 (e.g., the Internet). The source device 308 is able to be any device containing source information including, but not limited to, a searchable database, web pages, transcripts, statistics, historical information, or any other information or device that provides information. The network 310 is able to any network or networks including, but not limited to, the Internet, an intranet, a LAN/WAN/MAN, wireless, wired, Ethernet, satellite, a combination of networks, or any other implementation of communicating. The devices are able to communicate with each other through the network 310 or directly to each other. One or more of the devices is able to be an end user device, a media organization, a company and/or another entity. In some embodiments, peer-to-peer sourcing is implemented. For example, the source of the data to be compared with is not on a centralized source but is found on peer sources.

Figure 4:
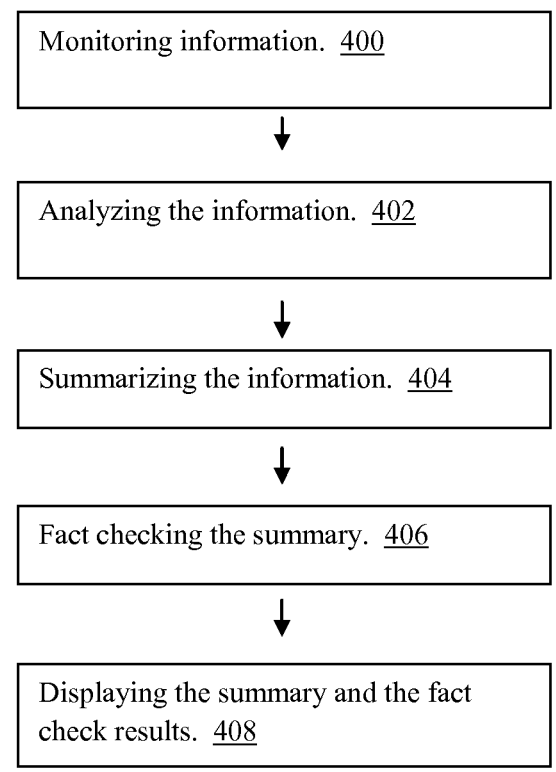
FIG. 4 illustrates a flowchart of a method of summarizing and fact checking according to some embodiments.

FIG. 4 illustrates a flowchart of a method of summarizing and fact checking according to some embodiments. In the step 400, information (e.g., target information) is monitored. In the step 402, the information is processed/analyzed. In the step 404, the information is summarized. In some embodiments, the information is summarized using lexical chaining or another summarization implementation. In some embodiments, the summary includes selected sentences based on the lexical chaining. For example, 5 sentences are selected using lexical chaining. In some embodiments, the sentences are unedited, and in some embodiments, the sentences are edited (e.g., only segments of sentences are selected). In the step 406, the summary generated is fact checked by comparing the summary with source information. For example, the summary is separated into segments which are fact checked by comparing the segments with source information. In the step 408, the summary and/or fact check results are displayed. In some embodiments, fewer or additional steps are implemented. For example, in addition to fact checking the summarized information, the entire target information (or a larger portion than the summary) is fact checked as well. In some embodiments, the order of the steps is modified. For example, in some embodiments, the information is fact checked, and then the fact checked information is summarized. For example, only content determined to be factually accurate is summarized or only content determined to be factually inaccurate is summarized, or another characterization is summarized.

In some embodiments, lexical chaining is utilized to summarize target information. For example, a video is monitored or a web page is analyzed, and instead of or in addition to fact checking the monitored/analyzed information, a summary is generated using lexical chaining. The generated summary is fact checked by comparing the summary or portions thereof with source information.

In some embodiments, lexical chaining is utilized to summarize source information. For example, instead of or in addition to storing entire web pages, articles, transcripts, and/or other source information to be used to compare with target information, summaries or lexical chains of the source information are generated and stored. In some embodiments, only summaries are stored, and only the summaries are used for comparing with target information. In some embodiments, the summaries are generated and used but not stored. In some embodiments, summaries are stored with the full source information, and the summaries are used in a preliminary comparison to determine if a source is useful, and then the full text is used for further comparison to determine a fact check result.

A lexical chain is a sequence or collection of related words or multiword phrases. The related words are able to be close in proximity (e.g., adjacent words or words in the same sentence) or not close (e.g. somewhere in the same document). Words are able to be considered related in any manner such as based on a thesaurus. A lexical chain is able to be dependent on or independent of grammatical structure. A lexical chain receives a score based on the length of the chain and/or the relationships between the chain items (e.g., same word, antonym, synonym, meronym, hypernym, holonym). The lexical chain is able to be used to determine topical elements in a document which are then able to be used to summarize the document. A lexical chain with a higher score represents a key concept whereas a lower score is a minor point.

Lexical chaining is implemented in any manner. In some embodiments, lexical chaining utilizes one or more sources such as: the WordNet thesaurus, a segmentation algorithm, a part of speech tagging system, and a parser. In some embodiments, relationships between words are identified for lexical chaining. An example of generating lexical chains includes: selecting a set of candidate words/phrases, finding an appropriate chain using relatedness criteria among members of the chains for each candidate word, and inserting a word in the chain if a word is found. In some embodiments, the set of selected candidate words is based on social networking information or other user information. For example, a user's social networking page is analyzed and keywords are determined (e.g., based on use count or lexical chaining of the social networking information), and the determined keywords are used as the set of selected keywords. Another example of generating lexical chains is implemented without selecting candidate words/phrases. Factors are analyzed when determining the strength of the chain such as repetition, density, relationship between words, position within text, and length. Chains are able to be scored in any manner. In some embodiments, chain scores are determined by testing/training and providing a manual (human) score to each chain. In some embodiments, several lexical chains are generated, and each are used to generate a summary, which are then reviewed and rated manually (e.g., by a human), and the lexical chain that generated the best summary is selected for further use. In some embodiments, the chain score/strength is based on the length of the chain which is based on the number of occurrences of members of the chain. In some embodiments, a homogeneity index is analyzed to determine the strength of the chain such that the index is based on the number of distinct occurrences divided by the length. After chains are scored, they are able to be compared/ranked (e.g., top ranked chain has the highest score). The highest score chains are considered to be the strongest chains; for example, all chains with a score above a threshold are considered strong chains. Once strong chains have been determined, full sentences or phrases are extracted based on the chains. In one example, a sentence with the first appearance of a member in a strong chain (or the strongest chain) is extracted. In another example, a sentence with the most members of a strong chain (or the strongest chain) is extracted. In some embodiments, a single sentence is extracted for each strong chain, and in some embodiments, multiple sentences are able to be extracted for each strong chain if the number of members in each sentence is above a threshold. In some embodiments, a list of lexical chains is generated, and for each lexical chain, a list of locations in the document referencing the lexical chain, page/line numbers or other location data, and/or a number/score denoting the contribution of the chain to the representation of the document are generated.

In some embodiments, lexical chaining utilizes/incorporates fact check results/information. For example, information is fact checked, and only factually accurate sentences are analyzed for lexical chaining. In another example, only factually inaccurate sentences are analyzed for lexical chaining. In some embodiments, all sentences are analyzed for lexical chaining, but then only factually accurate sentences or only factually inaccurate sentences of the sentences with the strongest chains are extracted. In some embodiments, the factual accuracy of a sentence is combined with the lexical chain strength to generate a total sentence strength. For example, if a sentence is identified by a strong lexical chain (+1), but the sentence is factually inaccurate (−1), then the total sentence strength is 0. In another example, if a sentence is identified by a strong lexical chain (+1), and the sentence is factually accurate (+1), then the total sentence strength is +2. In another example, if a sentence is identified by a strong lexical chain (+1), and the sentence is questionable (0), then the total sentence strength is +1. Fact checking results/analysis are able to be used with lexical chaining in any manner.

In some embodiments, different summarizing implementations are utilized, the results are compared, and based on the comparison, a summarizing implementation is selected for future use. For example, summarizing implementation 1 and summarizing implementation 2 both summarize several articles, and summarizing implementation 1 is selected based on the comparison.

In some embodiments, summarization is implemented utilizing lexical chaining: the content is parsed/segmented as described herein, lexical chains are generated, strong chains are identified, and significant/strong sentences are extracted. In addition to or as part of lexical chaining, word distribution/word counts, cue phrase methods which use meta-linguistic markers, location methods, and/or formatting methods are utilized. For example, the number of times each word is used is counted, if the words are used under a heading is determined, where the words are located (e.g., beginning, middle, end of a document) is analyzed, and/or if the words are bolded, underlined, italicized or given any other special format or marker is utilized. Word frequency is able to be a helpful indication of important concepts. Taking into account word relations is able to increase the quality of the analysis.

In simplified embodiments of summarization and fact checking, the number of instances of each word is counted in the content (e.g., the word "taxes" is counted 15 times, "raising" is counted 10 times, and "employment" is counted 8 times). Then, sentences and/or phrases with the top (e.g., top 3—taxes, raising, employment) words counted are extracted. In some embodiments, only sentences with two or more of the top words are extracted, or only sentences with all of the top words are extracted. The extracted sentences are then fact checked by comparing them with source information, and a result of the fact check is provided. In some embodiments, all sentences with any of the top words are fact checked, and if the fact check result is factually accurate, then the sentence is extracted, but if the sentence is factually inaccurate, then the sentence is not extracted.

In some embodiments, summarizing utilizes social networking information or other information of a user to determine a focus of the information being summarized. For example, a user's social networking content (e.g., Facebook® pages, tweets) is analyzed, interests are determined using any interest determination analysis (e.g., locating frequently used words, based on "likes," based on sites visited), the interests are stored in a data structure, and the interests are utilized when performing the summarization analysis. For example, when performing lexical chaining, the chains are given strength values based on standard analysis, but then the chains are given additional strength based on the user information. Furthering the example, if lexical chaining determines "baseball" is in the strongest chain of an article, and "49ers" in a second strongest chain, and "49ers" is one of the user's interests, then the "49ers" chain strength is modified to be the strongest chain. The modification of chain strength is able to be implemented in any manner using any calculations. For example, if a word or phrase in a lexical chain is also in the user interest data structure, that lexical chain is put at the top of the strength list, and if multiple chains match items in the user interest data structure, then they are put at the top of the strength list but their chaining order is maintained among them. In another example, the user interest data structure includes values/weights, such that the user interest weight is added to the chain strength to compute a final strength. For example, some user interests are stronger user interests such as something the user loves versus something the user is mildly interested in, so the stronger user interests are given more weight than mild interests. The modified or final strengths are then able to be used in generating the summary. For example, the sentences with the highest final strengths are retained as the summary.

In focused embodiments of fact checking, headings detected within a document (e.g., in a resume, the heading "work history"), and only content within that heading area is fact checked (e.g., the content between "work history" and "education"). For example, content is analyzed, headings are detected (e.g., based on keywords such as "employment" or "work history," based on specialized formatting such as larger font, bold, underline, and/or based on metadata), content between specific headings is fact checked, and results are provided. Furthering the example, a data structure stores typical resume headings such as "education," "work history," "certifications," and/or any other headings. If a specific section is intended to be fact checked such as the "work history" section, then the content is analyzed by searching for "work history." After the heading "work history" is located, that location is stored as the beginning of the content to be fact checked. Then, another heading is searched for. Once any additional heading is located, that location immediately preceding the heading is stored as the end of the content to be fact checked. The content between the headings is able to be extracted and/or fact checked.

Figure 5:
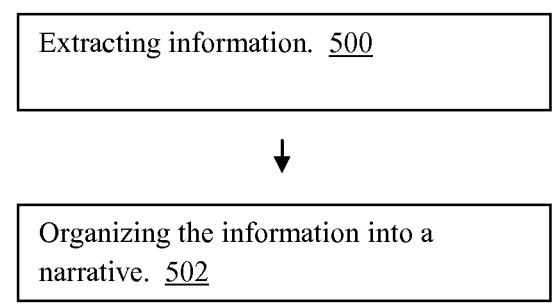
FIG. 5 illustrates a flowchart of a method of fact checking utilized with news generation according to some embodiments.

FIG. 5 illustrates a flowchart of a method of fact checking utilized with news (or any kind of story/content) generation according to some embodiments. In the step 500, information is extracted from one or more data sources. For example, information from a user's resume is extracted. The information from the resume is able to be the user's name, most recent occupation, most recent employer, schooling, and/or any other information. In some embodiments, the extracted information is stored in a data structure such as a database. The system is able to automatically place the extracted information into appropriate cells in the data structure. For example, the user's name is placed in a "name" cell, and the user's occupation is stored in an "occupation" cell. The system is able to determine which information is stored where in any manner, such as based on keyword analysis, location of the information in a document analysis, and/or any other manner. In some embodiments, the information is only factually accurate information as determined by fact checking, only factual information, such as numbers/statistics, and/or other factually verifiable information. In some embodiments, the information extracted is fact checked. In some embodiments, the information is fact checked before or after it is extracted. In some embodiments, only factually accurate information is extracted/retained. In some embodiments, a fact check status of the extracted information is stored and indicated. In some embodiments, the information extracted is analyzed to determine if it is factual information versus another type of information such as opinion by pattern analysis, language analysis and/or any other analysis. In the step 502, the extracted information is organized into a narrative. Organizing includes generating content and including the extracted information in appropriate locations within the content. For example, templates of text are utilized, and locations (e.g., placeholders) are reserved which are filled in with extracted information. Continuing with the resume example, a template includes: "*name* is a *occupation* who is working at *employer*. *name* graduated from *college*." The items such as *name*, *occupation*, *employer* and *college* are input using the extracted information. Other text such as "who is working at" is able to be retrieved from the template or a data structure which stores the information, so that it is able to be retrieved and incorporated into a story that is readable by a human. In another example of a template, a template includes pre-drafted text with place holders which are automatically replaced by retrieved/extracted content. In another example of a template, a data structure stores pre-drafted text and placeholders, and a method is designed to utilize the pre-drafted text at specified times/places and fill in and utilize the placeholders with extracted content. Templates are also able to store other content such as images, videos, sounds, advertisements and/or any other content. Any template, method and/or implementation is able to be utilized to generate content. In some embodiments, fewer or additional steps are implemented. For example, in some embodiments, artificial intelligence is utilized to incorporate emotions and/or a personality into the narrative. For example, instead of placing data into place-holders embedded in text, artificial intelligence is utilized to make the article even more human-friendly such as by providing anecdotes, commentary, and/or historical references. The artificial intelligence is able to be implemented in any manner such as by inputting additional information into a data structure which the system retrieves at random or determined times, and/or based on acquiring additional information on the Internet. For example, the system analyzes a user's social networking page and determines that the user is a 49ers fan (e.g., by searching for and locating specific words/phrases, by determining words/phrases most commonly used by the user such as based on word use frequency, or the user information is manually input), so the system utilizes a database containing references to the 49ers, and at random or specified points in an article interjects a comparison or reference to the 49ers. Furthering the example, if the user is reading an automatically computer-generated article about football, a sentence is added specifically regarding the 49ers. In some embodiments, the social networking information and/or other acquired information about the user (e.g., preferences, history, occupation, finances, purchases) is utilized to determine the focus (e.g., based on a keyword used most often or another classification analysis) of the article being generated. For example, if the article being generated utilizes data sources with information from all 32 football teams, the article is able to focus on information relevant to the 49ers. For example, a database stores one or more keywords or user focuses in different classifications (e.g., football→49ers, economics→taxes, environment→global warming, pollution), and when generating content, the original content is classified or was previously classified, and the original content classification is matched with the user classifications, and keywords in the matching classification are utilized when generating content, e.g., lexical chaining gives sentences with the keyword extra weight or only sentences containing the keyword or related to the keyword such as spatially or topically are utilized for analysis such as lexical chaining. For example, an original content article was classified as "football," so the "football" user classification is found, which contains the "49ers," and when the original content article is summarized, the sentences with the word "49ers" are used. In some embodiments, the order of the steps is modified.

In some embodiments, templates for use with automatic content generation are automatically generated. For example, an author/speaker/other entity is determined by name recognition, facial recognition, location recognition and/or any other manner, then text from a data structure is retrieved based on the detected entity (e.g., detect a politician's name, and take text from a "politician" template which has specific text and placeholders), then the placeholders are filled in with acquired information (e.g., from a database, a speech or an article). In another example of automatically generating a template, a template is generated based on the focus/topic of content (e.g., determine topic based on keyword analysis such as the most frequently used keyword). In some embodiments, the template to utilize is user-specific. For example, in addition to or instead of a template for politicians, there is a template for users who are Conservative, and there is a second template for users who are Liberal. Furthering the example, when a Conservative is speaking, a Liberal person receives an article or summary of the factually inaccurate content from the Conservative, since the Liberal person may be more focused on finding the misinformation provided by the person with an opposing perspective. To utilize the user-specific template, users are classified. Generated content is also classified. Content (e.g., an article) is summarized multiple different ways (e.g., only factually accurate content, only factually inaccurate content, or content containing specified keywords is summarized), and the different summaries/generated content are stored in specific classifications. Then, the generated content and/or summaries are displayed/distributed based on the user classification and content classification (e.g., using matching classifications).

In some embodiments, generating, aggregating, summarizing and/or fact checking are based on details of the user (e.g., age, sex, preferences, hobbies, education, financial status, occupation, political affiliation, and/or any other details about the user). For example, specific templates are generated/used for each occupation, such that the specific template is utilized when content is generated. Furthering the example, the user is a doctor, and an article about taxes is being automatically generated using a recently published report. Several different templates (e.g., doctor, lawyer, unemployed) are/were generated for the article or for articles in general. The "doctor" template is used to tailor the article for the user who is a doctor. For example, if there is a specific tax on medical items, if medicare taxes are affected, or a tax bracket for wealthy people is increased, these items are included in the template and the generated article, whereas an "unemployed" template would include or focus on different aspects from the report. The specific text stored in the template and/or the placeholders are able to be template dependent. In some embodiments, content generated is generic content and user-specific content. For example, a generic article is generated which is applicable to all users, and user-specific content which is specific to the user or the type of user is generated. In some embodiments, the user information is utilized to determine what source information to use to generate the content. In some embodiments, the user information is utilized to determine what content to aggregate. For example, a keyword for a user (e.g., doctor) is utilized to match articles with the matching keyword. The user's information is able to be acquired, known, and/or used in any manner such as based on social network information, provided information, stored information, recent purchases, visited web sites, and/or channels watched.

In some embodiments, content (news) generation highlights key aspects of a topic. For example, items that are determined to be focal points or important points are included in the generated content. The key aspects are determined in any manner such as based on fact checking, based on headings, fonts, location of content, and/or any other stylistic information, based on social networking information (e.g., number of times sentence is re-tweeted), and/or any other manner. For example, based on social networking information (e.g., by crawling a user's Facebook® page), it is determined a user is a 49ers fan, so when a story is generated, the content retrieved is focused on the 49ers. A headline and/or photo is able to be generated and/or provided with the generated content. In some embodiments, the generated content is based on information provided by a person or people at the top of their profession such as CEOs. For example, a Twitter account of CEO is monitored, analyzed and content is generated using the tweets of the CEO. Furthering the example, the account information is fact checked, and the factually accurate information is used to generate new content, and/or the fact checked content is summarized. In some embodiments, content is generated by locating and utilizing information from opposing perspectives. For example, content is generated using two sources, one Conservative and one Liberal, and the information retrieved from the sources is incorporated with templates to generate a story. In some embodiments, source information is classified (e.g., Conservative/Liberal) manually or automatically to determine the sources provide opposing perspectives. Furthering the example, each of the sources is face checked, and more content is retrieved and utilized from the source with the higher factual accuracy rating and/or validity rating. An exemplary method of generating content with opposing perspectives includes: analyzing a first source content, analyzing a second source content, fact checking the first source content and the second source content, retrieving data based on the analysis (e.g., only factually accurate content), generating text/audio/images using a template, inputting the retrieved data in the template and displaying/transmitting the generated/retrieved content.

In some embodiments, the content generated is based on a keyword or phrase detected in monitored content. For example, a user is watching a news program, and a reference is made to an obscure topic. An article is automatically generated about the topic and is presented/sent to the user's smart phone. In some embodiments, the source of the detected keyword and/or user information (e.g., preferences, political affiliation, other information) is taken into account when generating the article. For example, if the source is Conservative, then the article is generated using Conservative content, or opposing content is generated using Liberal content. In some embodiments, the generated content includes multiple perspectives regarding the detected keyword/phrase.

Figure 6:
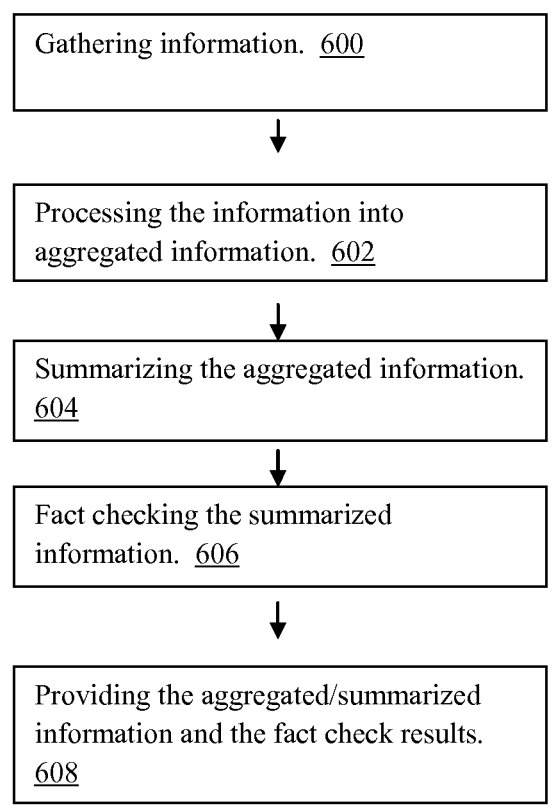
FIG. 6 illustrates a flowchart of a method of news aggregation, summarization and fact checking according to some embodiments.

FIG. 6 illustrates a flowchart of a method of news aggregation, summarization and fact checking according to some embodiments. In the step 600, information is gathered or collected. For example, a web crawler searches for and determines information such as news articles, images, video, social networking postings, and/or any other information. In another example, videos/media are downloaded and stored. In some embodiments, content with opposing perspectives is aggregated. For example, content is collected and classified (e.g., Conservative or Liberal), and then content from each perspective is aggregated/utilized. The content is able to be classified in any manner (e.g., manually or automatically). For example, manually classifying content includes users selecting a classification for content, or a media company classifying content, and the classifications are stored. In another example, automatically classifying content based on perspective is able to be based on matching an author/source/distributor of the content with a database storing names and perspectives, counting the number of keywords in the content, matching keywords in the title with topic keywords stored in a database, and/or any other manner. A database is able to store the classified content as pairs of opposing perspectives (e.g., Liberal/Conservative). If a content is determined to be from a first perspective or classification, then content in the other classification of the pair is considered to be from the opposing perspective (e.g., content is classified as Liberal, so content classified as Conservative is considered to be an opposing perspective). In the step 602, the gathered information is processed such as formatting, translating, organizing and/or any other processing to generate aggregated information. For example, the processing includes organizing the content in a user-friendly format specific to the user's device based on the device's capabilities or features or based on the user's preferences. In anther example, the aggregated information is organized in a list/tile form and/or is displayed. In some embodiments, the aggregated information is provided in a news feed. In the step 604, the aggregated information is summarized (e.g., using lexical chaining) as described herein. In some embodiments, each separate piece of information (e.g., article) is summarized separately. In some embodiments, the aggregated information is summarized as a whole (e.g., 1 summary is generated). In the step 606, the summarized information is fact checked by comparing the summarized information with source information. In the step 608, the aggregated information and/or summarized information is provided with the fact check results. In some embodiments, fewer or additional steps are implemented. For example, in addition to fact checking the summarized information, the entire aggregated information (or a larger portion than the summary) is fact checked as well. In some embodiments, the order of the steps is modified. For example, in some embodiments, the aggregated information is fact checked, and then the fact checked information is summarized (e.g., only content, such as an article, with a factual accuracy rating above a threshold is summarized and/or only specific elements, such as sentences, that are determined to be a specific characterization, such as only factually accurate or only factually inaccurate, are summarized).

In some embodiments, a modified implementation is utilized such as aggregating information and fact checking the aggregated information without summarization. The fact checking is implemented such that aggregated content is not displayed if the factual inaccuracy count of the content is above a threshold (e.g., count number of factually inaccurate phrases, and if above 10, then do not display the entire content (e.g., article) or the threshold is based on percentages—more than 10% of phrases or sentences are inaccurate, then the article is not displayed). For example, if 10 articles are found and aggregated, and 3 are determined to be factually inaccurate, then only 7 are displayed for the user. The threshold is able to be based on any classification—accurate, inaccurate, biased, questionable, and/or any other classification. In some embodiments, instead of not displaying aggregated content, the content is displayed but the fact check results are displayed with the content (e.g., article is displayed but with highlighting and description of inaccurate content). In some embodiments, the fact checking occurs before the aggregation. For example, if content is fact checked, and the content has too many inaccuracies or too much bias, then the content is not collected and stored. In another example, the content is aggregated after being fact checked, but the fact check results are stored with the content for future display.

Figure 7:
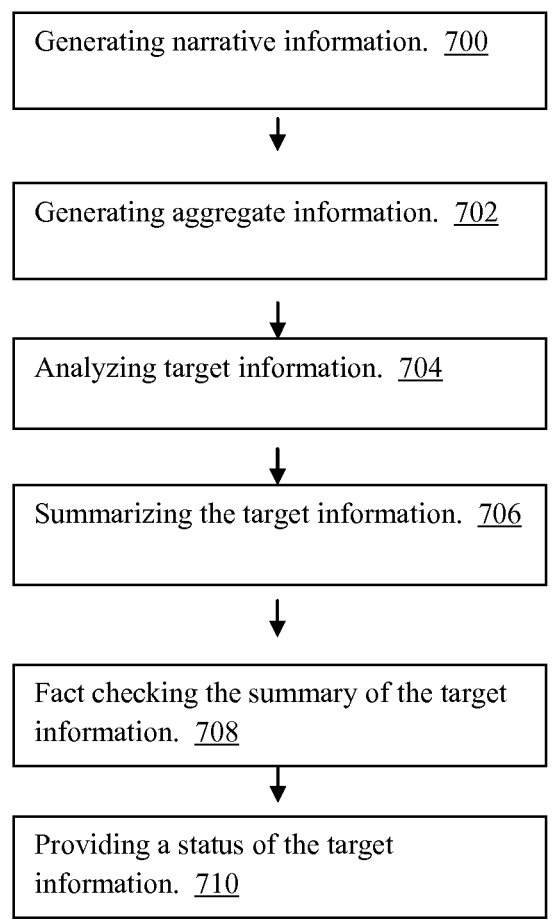
FIG. 7 illustrates a flowchart of a method of fact checking utilized with news aggregation and news generation according to some embodiments.

FIG. 7 illustrates a flowchart of a method of fact checking utilized with news aggregation and news generation according to some embodiments. In the step 700, narrative information is generated by analyzing one or more data sources including extracting data from the data sources and organizing data from the data sources into a narrative. In some embodiments, the data includes only factual information, and in some embodiments, the data only includes factually accurate information. In some embodiments, the data includes any type of information. In some embodiments, the data sources include a single type of data source such as a database, and in some embodiments, the data sources include multiple types of data sources such as a database, web pages, television content, and/or any other content. In the step 702, aggregate information is generated by aggregating data from one or more data sources. In some embodiments, the data sources for aggregating are the same data sources as the data sources for generating narrative content. In some embodiments, the data sources are different or there is some overlap of the data sources. Aggregating the data is able to be performed in any manner such as crawling for content (e.g., news stories) and organizing the content in a user-friendly manner. The data is able to be crawled for based on author, distributor, network, website, source, keyword, and/or any other content. When data is found, the data or identification information of the data is stored. For example, a link to a web page is stored in a database. In another example, the text (and other content) of a web page is stored. In another example, a transcript of audio is stored. In the step 704, target information is analyzed. Analyzing is able to include any form of analysis such as parsing the information into sentences/phrases, locating and filtering out redundant information, locating matching or frequently used words/phrases, and/or any other analysis. In some embodiments, the target information includes the narrative information, the aggregate information and/or additional information. For example, an article about a user is generated automatically, aggregate information is gathered regarding the user, and a user has made a social networking post—all of these are analyzed. In another example, an article about the economy is automatically generated based on statistics and data gathered, articles that discuss the economy are also aggregated, and a video is discussing the economy—all of these are analyzed. In some embodiments, the target information does not include the narrative information and/or the aggregate information. For example, the target information only includes a video the user is currently watching. In another example, the target information includes a webpage the user is currently reading and aggregated information related to the webpage. In the step 706, the target information is summarized to generate a summary of the target information. For example, the summary includes 5 sentences extracted from the original content. In the step 708, the summary of the target information is fact checked by comparing the summary of the target information with source information to generate a result. In the step 710, a status of the target information is provided in real-time based on the result of the comparison of the summary of the target information with the source information. In some embodiments, fewer or additional steps are implemented. For example, in addition to or instead of fact checking the summarized information; the entire aggregated information (or a larger portion than the summary), the generated information and/or any target information is fact checked. In some embodiments, the order of the steps is modified.

In some embodiments, content (e.g., articles) is retrieved and/or presented based on its factual accuracy. For example, if two articles are written about a news story (e.g., same topic and/or date and/or number of matching keywords above a threshold), the two articles are fact checked, and the more accurate one is presented. In some embodiments, after the two articles are fact checked, only the more accurate one is summarized, and the summary is presented. In some embodiments, the articles are summarized first, and then the summaries are fact checked.

In some embodiments, contributors (e.g., executives, entrepreneurs, investors) are able to provide information to a site, and the information is fact checked automatically. For example, CEO X provides commentary on a revolutionary technology, but before or after his commentary is posted to the site, it is fact checked as described herein. In some embodiments, the commentary is summarized before or after it is fact checked, or the commentary is summarized instead of being fact checked. In some embodiments, content is generated. For example, content is generated related to the contributor/contributor's content. In some embodiments, the generated content supplements the contributor's content. In some embodiments, content is aggregated related to the contributor. For example, articles about the contributor (e.g., detected by searching for contributor's name), articles written by the contributor, videos of the contributor (e.g., detected by facial recognition), and/or any other content are aggregated.

In some embodiments, content on a same topic is compared when generating a summary and/or new content and/or aggregating content. In some embodiments, the content is from different perspectives or opposing perspectives. For example, content from a first perspective is compared with content from a second perspective. Furthering the example, an article about "taxes" written by a Conservative is compared with an article about "taxes" written by a Liberal. The comparison of the content is able to be performed in any manner. For example, utilizing lexical chaining, both articles are summarized, and the summaries are provided/displayed together (e.g., next to each other, one after the other, one above the other). In some embodiments, the summaries of each article are interwoven. For example, the first sentence from the first summary is provided, followed by the first sentence from the second summary, followed by the second sentence from the first summary, and so on. In some embodiments, the sentences from each summary are organized so that they address the same specific topic in the article (e.g., based on keywords). In some embodiments, the articles are fact checked before and/or after the summaries are generated. For example, the articles are fact checked, and only sentences that are determined to be factually accurate are utilized in generating the summary. Furthering the example, words in sentences that are determined to be factually inaccurate are not counted/used when performing lexical chaining.

Figure 8:
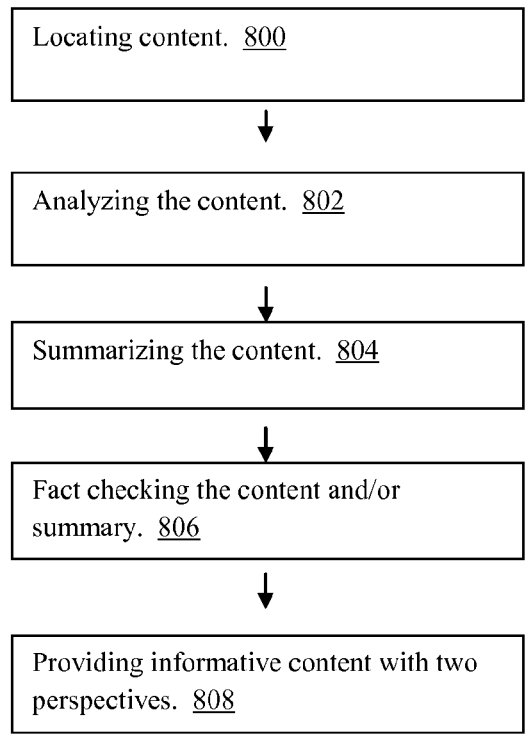
FIG. 8 illustrates a flowchart of a method of utilizing multiple items of content to generate a summary or new content according to some embodiments.

FIG. 8 illustrates a flowchart of a method of utilizing multiple items of content to generate a summary or new content according to some embodiments. In the step 800, two or more items of content (e.g., articles) are located. In some embodiments, locating includes determining the topic of the content and/or the perspective of the content. Determining the topic is able to be performed in any manner such as counting the number of matching keywords in the content, matching keywords in the title with topic keywords stored in a database, and/or any other manner. Determining the perspective of the content is able to be performed in any manner such as matching an author/source/distributor of the content with a database storing names and perspectives, counting the number of keywords in the content, matching keywords in the title with topic keywords stored in a database, and/or any other manner. For example, if an article is written by a known conservative, it can be assumed that the article is written from a conservative perspective. A database storing authors/commentators/broadcasters/bloggers/politicians/other entities, sites, and/or other identifying information with the perspective information is able to be utilized. For example, a database stores names of authors and their political leaning/perspective. Other information is able to be utilized to determine an author's perspective, such as personal information, background information, and/or social networking information. For example, if a very wealthy person writes an article on the benefits of lowering taxes, it may be assumed that the person is not writing from a poor person's perspective. In the step 802, the content is analyzed. Analyzing is able to include processing such as parsing, formatting and/or any other analysis. In the step 804, the content is summarized. In the step 806, the content and/or summary are fact checked. For example, if the content is fact checked, modified content is able to be generated where any content that is determined to be factually inaccurate or another specified classification is not included in the modified content. For example, a content has 100 sentences, 15 of the sentences are determined to be factually inaccurate, so the modified content is generated with by deleting those 15 sentences such that only 85 sentences remain. In the step 808, an informative content with two or more perspectives is provided by combining the summaries and/or modified content. In some embodiments, fewer or additional steps are implemented. For example, the steps of fact checking and/or summarizing are omitted, and the two or more contents are combined. In some embodiments, the order of the steps is modified. For example, the content is fact checked before being summarized, and the summarizing takes into account the fact checking results.

Figure 9:
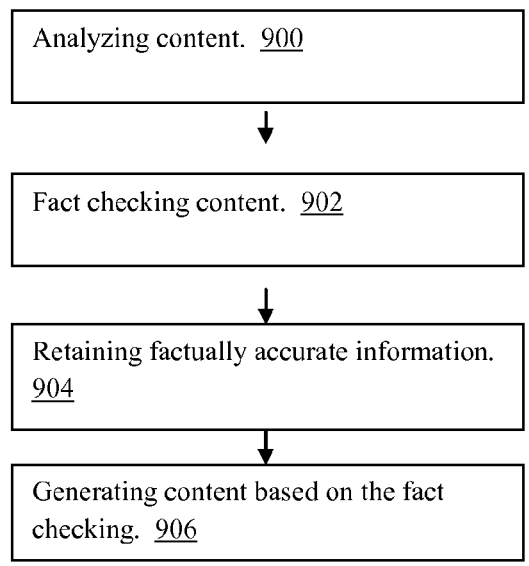
FIG. 9 illustrates a flowchart of a method of utilizing fact checking to generate content according to some embodiments.

FIG. 9 illustrates a flowchart of a method of utilizing fact checking to generate content according to some embodiments. In the step 900, content is analyzed. Analyzing is able to include processing such as parsing and/or any other analysis. For example, the content is analyzed and determined to be related. For example, using a keyword-based analysis, summary comparison analysis, time/date analysis, topic analysis, and/or any other analysis, it is determined that two or more articles are related. Furthering the example, it is determined based on keyword comparison, topic analysis and the dates of the articles, that two articles are related to the effect of tax cuts on employment. In some embodiments, articles with opposing perspectives are located and analyzed, or several articles with same perspective on each side of an argument are utilized. For example, an article with a liberal perspective on tax cuts and an article with a conservative perspective on tax cuts are analyzed. Determining that articles or other content have opposing perspectives is able to be performed in any manner such as manually classifying and selecting content in opposing sides (e.g., liberal/conservative), by comparing authors/sources of articles (e.g., Fox News/MSNBC or conservative author/liberal author), based on specific keyword detection (e.g., pro-choice/pro-life), and/or any other manner. In the step 902, the content is fact checked as described herein. For example, several articles are fact checked. In the step 904, the information (e.g., sentences or phrases) that is determined to be factually accurate is retained, and the other information is discarded. In some embodiments, only the information with the highest confidence score (e.g., top 10 sentences) is retained. The confidence score is able to be generated in any manner; for example, a confidence score is based on the number of sources that agree or disagree with the information—10 sources agree/match with the information and 0 disagree=100% confidence score. In the step 906, based on the fact checking, a joint summary or new content is generated. For example, a data structure stores the top 5 factually accurate sentences from each document, and an output is the 5 sentences from each, interwoven to generate content. In some embodiments, the content is color-coded and/or another distinguishing feature is utilized. For example, all sentences from Article 1 are in green, and all sentences from Article 2 are in red. In some embodiments, the content is interwoven in chronological order based on the original content (e.g., even though Sentence 1 has the highest confidence score, since it appeared at the beginning of an article, it is placed first in the new content). In some embodiments, the 5 sentences from each are kept separate but placed proximate to the other content, so that a user is able to read the sentences from each article separately. For example, 5 sentences from Article 1 are stored/presented, and immediately below are 5 sentences from Article 2. In some embodiments, the sentences from each article are matched based on keywords and/or any other matching, so that relevant sentences are included/displayed together. In some embodiments, the factually accurate content is utilized with or incorporated in one or more templates to generate new content. For example, a template includes the following text: "The topic is *keyword*, and from one perspective: *FC1* but from a different perspective *FC2* . . . " where FC1 and FC2 are selected sentences from the content that are determined to be factually accurate. In some embodiments, fewer or additional steps are implemented. For example, in some embodiments, the content is located automatically by searching for keywords and/or any other method of locating content. In another example, the content is summarized as described herein and the summaries are merged. In some embodiments, the order of the steps is modified.

Figure 10:
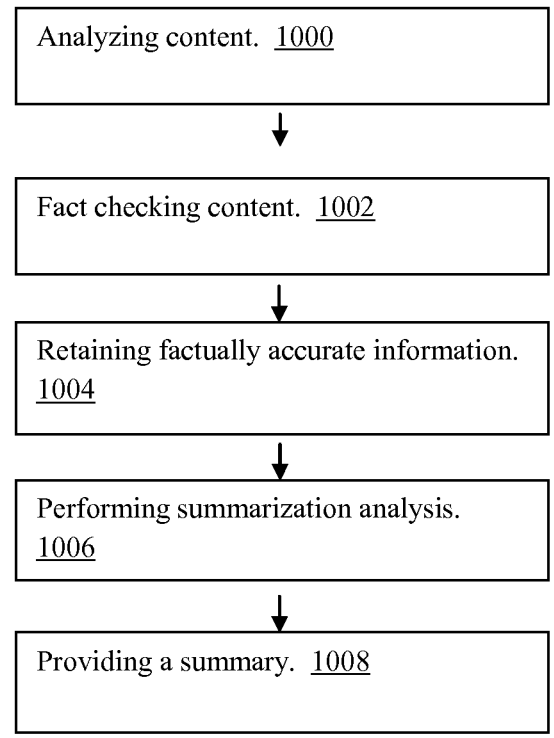
FIG. 10 illustrates a flowchart of a method of utilizing fact checking for summarization according to some embodiments.

FIG. 10 illustrates a flowchart of a method of utilizing fact checking for summarization according to some embodiments. In the step 1000, content is analyzed. Analyzing is able to include processing such as parsing and/or any other analysis. In the step 1002, the content is fact checked as described herein. In the step 1004, the information (e.g., sentences or phrases) that is determined to be factually accurate is retained, and the other information is discarded. For example, if information is determined to be questionable or inaccurate, then it is discarded. In some embodiments, only the information with the highest confidence score (e.g., top 10 sentences) is retained. In some embodiments, only factually inaccurate information is discarded such that factually accurate and questionable information are retained. In some embodiments, information determined to be biased is discarded, and in some embodiments, biased information is retained. Information is able to be determined as biased in any manner, such as comparing the information with a bias database (e.g., storing keywords that indicate bias), crowd-sourcing, manually labeling items as biased or not, and/or any other manner. In some embodiments, other characterizations of content (e.g., unverified) are retained or discarded. In the step 1006, summarization analysis (e.g., lexical chaining) is performed. In some embodiments, the summarization analysis is performed only on the retained information. For example, if 75 out of 100 sentences are retained as being factually accurate, lexical chaining is performed on those to generate a summary. Thus, the summary is generated without using the 25 non-factually accurate sentences. In some embodiments, the summarization analysis is performed on the entire content. Then, a comparison is made between the information determined from the summarization analysis and the fact checking. For example, if Sentence 1 is determined to be factually accurate and relevant to a summary based on lexical chaining, then Sentence 1 is utilized when generating a summary; however, if Sentence 2 is determined to be factually inaccurate and relevant to a summary based on lexical chaining, then Sentence 2 is not utilized when generating a summary, or if Sentence 3 is determined to be factually accurate but not relevant to a summary based on lexical chaining, then Sentence 3 is not utilized when generating a summary. In some embodiments, the summarization analysis is performed on the retained information and the entire content. For example, if the summarization analysis of the retained information results in a sufficient summary (e.g., above a number of sentences threshold or any other qualification), then the summarization analysis is not performed on the entire content, but if the summarization analysis of the retained information does not have a sufficient result, then the summarization analysis of the entire content is performed, and a comparison of that summarization analysis with the fact checking results is performed to generate a summary. In the step 1008, a summary is generated/provided. For example, the summary is sent to a user device and/or displayed on a screen. In some embodiments, fewer or additional steps are implemented. For example, in some embodiments, the step of summary analysis is not performed, and the summary is simply the content remaining after discarding the non-factually accurate information or inaccurate information. In some embodiments, the order of the steps is modified.

In some embodiments, a summary is provided as a list/tiles/GUI of sentences/phrases that are selectable (e.g., clickable), where selecting an item from the list causes the full content (e.g., article) to be displayed at the location of the selected sentence, with the sentence highlighted. For example, a user is presented a summary of a speech, where the summary is 5 sentences from the speech determined using lexical chaining. The 5 sentences are displayed as separate clickable items. When the user clicks one of the sentences, the user is taken to the sentence in the full transcript of the speech or the point of the audio where the sentence is said.

In some embodiments, a summary is generated based on fact checking and/or other summarization implementations by utilizing the most factually accurate and/or most factually inaccurate content. For example, the 5 most factually inaccurate items (e.g., sentences/phrases) are retained and used for the summary. In another example, the 5 most factually accurate items that are associated with the top 3 lexical chains are used for the summary. Determining the 5 most factually accurate or inaccurate items is able to be performed manually or automatically. For example, the fact checked items are able to be ranked based on confidence scores, numbers of agreeing/disagreeing sources and/or fact checking score above/below a threshold.

In some embodiments, user responses (e.g., thumbs up/down), tweets, likes/dislikes, comments, and/or any other user input are incorporated when merging, generating, aggregating, and/or summarizing content. For example, if an article has been re-tweeted many times, the number of sentences from that article used when merging, summarizing, and/or generating is increased. Furthering the example, if an article has received no comments, then a standard amount of sentences (e.g., 5 sentences) is used for summarizing the article, but if the article has received many likes on a social networking site, then the amount of sentences used for summarizing the article is increased (e.g., by 2). In some embodiments, if an article has been disliked by enough users (e.g., above a threshold), then the article is not used when performing a merge/generation of new content. For example, if an article has received 100 thumbs down, then it may not be a good article to use when presenting opposing perspectives, so even though it may pass other criteria, it is not permitted to be used. Similarly, comments following an article are analyzed and utilized. For example, if many of the comments write, "this is a terrible article," then the article is negatively affected (e.g., not used).

In some embodiments, the merging, generating, aggregating, summarizing and/or fact checking automatically incorporate user interests. User interests are able to be used to determine which content to merge, generate, aggregate, summarize and/or fact check and/or which content to provide/display to a user and/or how to provide/display the content. For example, topics are able to be determined from the user interests, and the topics are utilized by the system to select topics for content generation or content aggregation. For example, if a user is interested in stocks, then articles about stocks are automatically generated for that user as opposed to articles about reality stars. In another example, finance articles are aggregated using detected keywords in the articles for a user who is interested in stocks. In another example, when summarizing, keywords based on a user's interests are used in determining which sentences to retain for the summary. Furthering the example, lexical chains are analyzed to determine if any user interest keywords are within any lexical chain, and if so, that chain is considered strong or is given added strength. User interests are able to be determined in any manner, such as clicking "interested" after visiting a website, or filling out a survey, or not clicking disinterested after visiting a website where classification/topic of the site is automatically accepted by visiting, via social networking (e.g., analyzing social networking content for keywords/topics), by "liking" content, by sending a tweet with a hashtag or other communication with the topic, by selecting content (e.g., from list of selectable sources), using another social media forum (e.g., items/photos pinned on Pinterest and videos liked on Youtube indicate interests of those users), and/or any other implementation. In some embodiments, a topic is considered to be of interest to a user if the topic is associated with an organization/entity that the user has "liked" (or a similar implementation), where associated means approved by, written by, affiliated with, or another similar meaning. In some embodiments, a topic of a site becomes an interested topic if a user uses or visits the site. In some embodiments, a site is one of interest if a user uses or visits the site while signed/logged in (e.g., signed in to Facebook® or Google+ ®). In some embodiments, the user must be logged into a specific social networking system, and in some embodiments, the user is able to be logged into any social networking system or a specific set of social networking systems. In some embodiments, the sites are limited to a specific method of indicating interest such as only sites visited while logged in. In some embodiments, a site topic is of interest if the site is recommended to the user (e.g., by a contact) (even if the user does not visit/review the site), unless or until the user rejects/disapproves of the site. In some embodiments, sites/topics are suggested to a user for a user to accept or reject based on contacts of the user and/or characteristics of the user (e.g., location, political affiliation, job, salary, organizations, recently watched programs, sites visited). In some embodiments, the contacts are limited to n-level contacts (e.g., friends of friends but not friends of friends of friends). In some embodiments, users are able to indicate disinterest in topics.

In some embodiments, content/data for aggregation, summarization, generation, fact checking and/or merging is able to be retrieved from many different sources such as databases, social networking sites/posts (e.g., tweets, Facebook® postings), newsfeeds, television, radio, gaming communications, messaging, and/or any other communication/information.

In some embodiments, summarization (e.g., lexical chaining) is utilized with multiple items of content. For example, Fox News, CNN and MSNBC all have 1 story about a recent event. To provide a complete summary, all three articles are analyzed and utilized to generate a summary. For example, the 3 articles are merged into one complete article, and lexical chaining is performed on the merged article. Then, based on the lexical chaining of the merged article, a summary is generated. In some embodiments, the relative position of each sentence is maintained when merging the articles. For example, the first sentence of each article is given position 1, so as not to change the positioning of the sentences after the merger, since sentences closer to the beginning may be given more weight than sentences in the middle of the article. In some embodiments, the articles are interwoven when merged such that the first sentence from each are together, the second sentence from each are together and so on. In some embodiments, dates, headlines, headings, and/or other information is utilized in determining which articles to summarize together. In some embodiments, the multiple items of content are from the same source (e.g., network) such as the transcript from 5 CNN shows. In some embodiments, the multiple items are different kinds of content (e.g., article, transcript, video log). In some embodiments, the multiple items are from different sources (e.g., Fox News, CNN, MSNBC). In some embodiments, the summarization is used to determine if a topic is worth fact checking. For example, if the lexical chaining provides poor results, it may indicate that the topic is not worth fact checking, and fact checking resources are reserved for another topic.

In some embodiments, links or any other access to a full story are provided with a summary and/or merged story. For example, if two articles are merged into one, links to each of the articles are provided for the user to access the original articles.

In some embodiments, when multiple items of content are generated, summarized and/or merged, the items are fact checked before being summarized/merged, and the fact checking results affect the summarization/merger. For example, the items are given a factual accuracy rating based on the fact checking Furthering the example, if an article has 1000 pieces of fact checkable content (e.g., phrases), and 100 pieces are determined to be factually inaccurate, the factual accuracy rating is 90.00%. The factual accuracy rating is able to be determined in any manner. The factual accuracy ratings of the items are able to be compared. For example, a first article receives a 95.00% accuracy rating, and a second article receives a 92.00% accuracy rating. Since the first article has a higher rating, it receives preferential treatment. For example, the summary of the first article is placed first or in larger print. In another example, when merging the two items, 7 sentences are retrieved from the first article, and only 5 items are retrieved from the second article. Similarly, when aggregating content, the higher factually accurate content is placed first or above the lower accuracy content. For example, if 10 articles are aggregated, the most prominent article is the one with the highest factual accuracy, and so on until the article with the lowest factual accuracy. In some embodiments, if an article (or other content) has a factual accuracy rating below a threshold, the article is not aggregated, summarized, merged, or used for story generation.

In some embodiments, an entity including, but not limited to, a speaker, author, news sources (e.g., CNN, Fox News), user, or another entity (e.g., corporation) has a validity rating that is included with the distribution of information from him/it. The validity rating is able to be generating automatically, manually or a combination thereof. The validity rating is able to be based on fact checking results of comments made by an entity and/or any other information. For example, if a person has a web page, and 100% of the web page is factually accurate, then the user is given a 10 (on a scale of 1 to 10) for a validity rating. In another example, a user tweets often, and half of the tweets are factually accurate and half are inaccurate, the user is given a 5. For example, the validity rating is a percent divided by 10, so 100%=10 and 50%=5. In another example, a journalist's articles, tweets, interviews, and/or any other content is fact checked to determine a validity rating. The validity rating is able to be calculated in any manner. In addition to fact checking information by an entity, items such as controversies, bias, and/or any other relevant information is able to be used in calculating a validity rating. The severity of the information or misinformation is also able to be factored in when rating a person or entity. Additionally, the subject of the information or misinformation is also able to be taken into account in terms of severity. In some embodiments, an independent agency calculates a validity rating and/or determines what is major and what is minor. In some embodiments, individual users are able to indicate what is important to them and what is not. In some embodiments, another implementation of determining what is major, minor and in between is implemented. The context of the situation/statement is also able to be taken into account. In some embodiments, entities are able to improve their validity rating if they apologize for or correct a mistake, although measures are able to be taken to prevent abuses of apologies. In some embodiments, in addition to or instead of a validity rating, an entity is able to include another rating, including, but not limited to, a comedic rating or a political rating. In some embodiments, an entity includes a classification including, but not limited to, political, comedy or opinion. Additional factors usable for the calculation of validity ratings include, but are not limited to the number of lies, misstatements, truthful statements, hypocritical statements or actions, questionable statements, spin, and/or any other characterizations.

In some embodiments, the validity rating is taken into account when content is merged, summarized, generated, aggregated, and/or fact checked. For example, a first article is written by a journalist with a validity rating of 9 out of 10, and a second article is written by a journalist with a validity rating of 7 out of 10. Since the journalist of the first article has a higher rating, that article receives preferential treatment. For example, the summary of the first article is placed first or in larger print. In another example, when merging the two items, 7 sentences are retrieved from the first article, and only 5 items are retrieved from the second article. Similarly, when aggregating content, the content of the author with the higher validity rating is placed first or above the lower validity rated authors. For example, if 10 articles are aggregated, the most prominent article is the one by the author with the highest validity rating, and so on until the article from the author with the lowest validity rating. In some embodiments, if an author/entity has a validity rating below a threshold, the author's content is not aggregated, summarized, merged, or used for story generation. In some embodiments, if an entity's validity rating is above a first threshold, then x (e.g., 7) sentences from the content by the entity are used, if the entity's validity rating is equal to or below the first threshold but above a second threshold, then y (e.g., 5) sentences from the content by the entity are used, and if the entity's validity rating is equal to or below the second threshold, then z (e.g., 3) sentences or no sentences from the content by the entity are used when merging, generating, and/or summarizing content. Any number of thresholds are able to be utilized. In some embodiments, fact checking is implemented differently based on an entity's validity rating. For example, if a journalist's validity rating is below a threshold, his content is fact checked by 2 different fact checking implementations, and if either implementation determines content to be inaccurate, the content is labeled as such or is negatively affected or his content is treated differently. In another example, content determined to be questionable or unverified of a journalist with a validity rating above a threshold is utilized (e.g., in generating, aggregating, summarizing), but content determined to be questionable or unverified of a journalist with a validity rating equal to or below a threshold is not used.

In some embodiments, a satisfaction rating is generated and/or utilized for an entity. For example, based on a survey of employees, a survey of customers, and/or analysis of social networking information, a corporation receives a satisfaction rating of how satisfied people are with the corporation. In another example, a journalist receives a satisfaction rating based on analysis of the stories provided by the journalist. The determination of the satisfaction rating is able to be generating automatically, manually or a combination thereof. For example, the comments section of an article is analyzed by searching for keywords, analyzing the thumbs up/down of comments, analyzing a rating of the article, analyzing the number of views/clicks of an article, analyzing the number of times an article is forwarded/shared/re-tweeted to other users, analyzing the duration of user views, and/or any other analysis, and based on this analysis a satisfaction rating is able to be generated. Furthering the example, if the comments describe the article as "poorly written" that would negatively affect the satisfaction rating of the author. As an example, Journalist X writes many articles, and his articles are posted online, and using a thumbs up or down clickable system, the articles receive many negative responses (only 3 out of 10 responses are thumbs up resulting in a base score of 3); additionally, the comments sections frequently include negative comments based on keyword analysis and lexical chaining of the comments (which is a −1 added to the base score), so Journalist X receives a rating of 2 out of 10. Any calculations/equations are able to be used to generate a satisfaction rating. In some embodiments, a user is able to specify that he likes or dislikes a specific author/reporter/media outlet/other entity. In some embodiments, by specifying that the user likes a entity, the satisfaction rating is set to the highest value regardless of other analysis. Similarly, if a user dislikes an entity, the satisfaction rating is set to the lowest value regardless of other analysis. The satisfaction rating is able to be utilized when determining if an article is used when generating, merging, summarizing, aggregating, fact checking, and/or any other operation on content. For example, if Journalist X has received a satisfaction rating of 2 out of 10, and a threshold is set at 7 of 10, where articles with a rating below 7 are excluded from being used when aggregating content, then Journalist X's articles are excluded when aggregating. In some embodiments, fact check results are utilized in generating a satisfaction rating. For example, if an author receives a 7 out of 10 based on the other satisfaction rating analysis, but the articles are fact checked and determined to be very factually inaccurate, the score of 7 is reduced to 5.

In some embodiments, a single fact check result is provided for an entire article/show/content. For example, only the most factually inaccurate (e.g., based on a factual accuracy score/rating) phrase or sentence is provided with analysis or commentary on its factual inaccuracy. In another example, only the factually inaccurate content with the highest confidence score is provided. In another example, only the factually inaccurate phrase in the strongest lexical chain is presented. In another example, only the fact check result (e.g., factually accurate, inaccurate, questionable) of a phrase in the strongest lexical chain is presented.

In some embodiments, the fact checking using summarization (e.g., lexical chaining) is utilized with re-runs, replays, second broadcasts, and/or any other additional presentations of the content. For example, a video is played which is fact checked using summarization, and then future displays of the video include the fact check results based on the previous fact checking so that fact checking does not need to be repeated, and the fact check results are displayed in real-time.

In some embodiments, content is generated, summarized, aggregated, and/or fact checked using social networking/media content (e.g., tweets, Facebook® postings). For example, a news article is generated regarding a current international conflict, and in addition aggregating news articles, tweets related to the conflict are aggregated as well. In some embodiments, the articles and/or the tweets are fact checked before or after being aggregated. For example, if a tweet has a factual accuracy rating below a threshold, then the tweet is not included in the aggregation. Similarly, if a tweet has a factual accuracy rating below a threshold, the tweet is not utilized when generating content. In some embodiments, only part of the content is fact checked (e.g., only tweets are fact checked, but the articles are not. In some embodiments, validity ratings and/or satisfaction ratings are utilized to determine if content is utilized when generating, summarizing, and/or aggregating. For example, a tweet of a user with a validity rating below a threshold is not utilized.

In some embodiments, a story is generated solely utilizing social networking/media content. For example, tweets are analyzed (e.g., to find tweets regarding a similar topic—for example, based on the same hashtag), the tweets are fact checked, the tweets with a factual accuracy rating and/or validity rating below a threshold are discarded, and summarization (e.g., lexical chaining) is utilized to extract relevant content from the tweets to generate a consolidated/summarized piece of content. In some embodiments, the multiple tweets are consolidated into a single tweet or a tweet with a link to a larger summary or another type of media (e.g., Facebook® post, web page). Similarly, aggregation is able to be utilized using only social networking content. In some embodiments, a larger percentage of content is generated/aggregated from social networking information. In some embodiments, a larger percentage of the resulting content is social networking information. For example, 51% of generated content is or is from social networking content. Any percentage of generated content is or is from social networking information (e.g., 51%, 75%, 90%, 95%, 99%).

In some embodiments, for breaking news that is difficult to verify, items are labeled as unverified until they are verified by sufficient resources. For example, next to a headline regarding a breaking news story, an icon symbolizing "unverified" is displayed. Additionally, the number of re-posts is able to be indicated. For example, the number of times that the story has been re-tweeted is indicated. The number of sources of information is also able to be indicated. For example, if 4 major networks are reporting a story, that may indicate more accuracy to the story than if only 1 network is reporting the story. Determining who is reporting a story and/or how many sources are reporting a story is able to be performed in any manner, such as using keyword analysis by monitoring and comparing transcripts of sources. In some embodiments, social networking information is also monitored to determine if there are any eye witnesses and/or images/videos which verify the breaking news. In some embodiments, stories are compared to determine if they are the same or similar, and the source of each story is determined. In some embodiments, stories are compared to determine if they conflict or if they agree. For example, it is determined that Fox News and CNN are both reporting that X occurred, so it is indicated that two sources agree. In another example, it is determined that Fox New is reporting that X occurred, and CNN is reporting that Y occurred, so it is indicated that there are conflicting reports. In some embodiments, the sources are indicated.

In some embodiments, the generation, aggregation, summarization and/or fact checking content utilizes language differences. For example, when generating content, articles from different languages are searched for and utilized. Furthering the example, to obtain different perspectives, news from Russia about Topic Z is likely going to have a different perspective than news from the U.S. Determining content is a different language is able to be performed in any manner such as by detecting words specific to a language (e.g., comparing words with different language dictionaries), detecting characters specific to a language, utilizing sources which provide content in different languages (e.g., CNN provides content in English, and Univision provides content in Spanish), based on metadata indicating the language, and/or any other implementation. Then, for example, an article in each language is utilized and merged using summarization as described herein. The new article includes information from the English article and the Russian article. When aggregating, generating, summarizing, and/or fact checking, the content is able to be automatically translated to the language of the viewer of the content. For example, the content in Russian is translated to English for an English user, so that when the content is displayed, the English user is able to read it. In some embodiments, the information is fact checked using sources originally in the same language. For example, a Russian article is fact checked using only Russian sources. In some embodiments, the information is fact checked using sources in another language (e.g., if two articles, one English and one Russian, are being used to generate another article, then the English article is fact checked using Russian sources, and the Russian article is fact checked using English sources). In some embodiments, the information is fact checked using sources in both/all languages.

Figure 11:
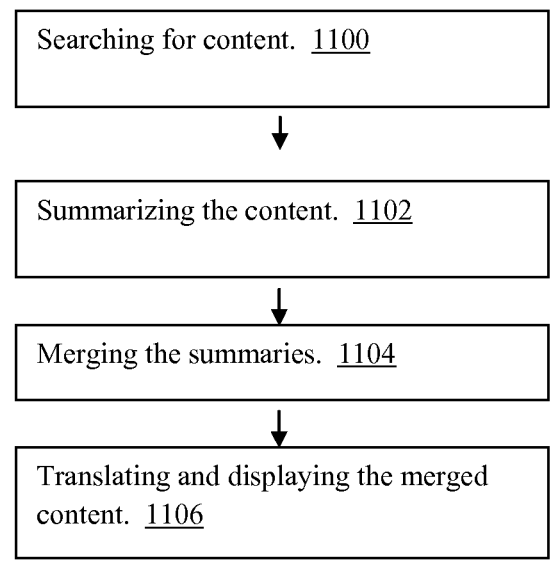
FIG. 11 illustrates a flowchart of a method of utilizing language differences in generating, aggregating, summarizing and/or fact checking according to some embodiments.

FIG. 11 illustrates a flowchart of a method of utilizing language differences in generating, aggregating, summarizing and/or fact checking according to some embodiments. In the step 1100, content is searched for including determining content is in different languages. In some embodiments, searching for content includes searching for keywords to ensure the content is the same topic, where the keywords are paired/grouped by language (e.g., airplane and avian are paired). For example, a data structure matches a word in a first language with a word in a second language. In the step 1102, the content is summarized as described herein. In the step 1104, the summaries are merged as described herein. For example, a first sentence of the English content summary is used first, and a first sentence of the Russian content summary is used second, and so on. In the step 1106, the multi-lingual content is translated to the user's language and displayed. For example, for an English-speaking user, only the Russian content or non-English content is translated. In some embodiments, fewer or additional steps are implemented. For example, the content is fact checked before being summarized, and only factually accurate content is used when summarizing. In some embodiments, the order of the steps is modified.

In some embodiments, advertising is generated based on lexical chaining. For example, when content is aggregated, summarized, and/or generated, the keywords of a lexical chain are analyzed to generate an advertisement which is able to be displayed with the content. Furthering the example, an article is generated about taxes, so an advertisement for tax preparation software is presented. For example, a keyword from lexical chaining is matched with a data structure containing keywords and advertisements that correspond to the keywords. In some embodiments, when several articles are utilized (e.g., merged), a keyword from the lexical chain from each article is used to generate the advertisement. For example, a first article is about golf, and a second article is about taxes, so an advertisement about money management is generated and provided.

In some embodiments, when generating an article, the content used to generate the article includes related topics or unrelated topics. For example, two articles with opposing views on cutting taxes are used to generate content, and the two articles are related to the same topic of taxes. In another example, an article about golf is merged with an article about taxes to provide content that involves two interests of a user.

In some embodiments, the optimized fact checking is utilized with augmented reality devices (e.g., glasses) and/or augmented reality information. Any of the methods described herein are able to be utilized with the augmented reality device such as generating, aggregating, summarizing, and/or fact checking. For example, a story is generated and/or summarized and presented on the user's augmented reality device. In some embodiments, the story is generated using/based on content acquired using the augmented reality device. For example, the user's augmented reality device detects Restaurant X, and instead of or in addition to providing a list of Yelp reviews, an automatically generated summary of the Yelp reviews is provided to the user on the augmented reality device. In another example, an augmented reality device detects a corporation's logo, and provides the user with a summary of the corporation, generates a news story about the company's finances, and/or aggregates recent news articles about the company, any of which is fact checked or not. In some embodiments, an augmented reality device detects content and provides a summary or fact checked summary. In some embodiments, an augmented reality device detects a politician or other person (e.g., using face/voice recognition), and generates a description of the politician including an opposing perspective of the politician's views. In some embodiments, a restaurant name is detected, and articles, social networking information (e.g., tweets), and/or any other content related to the restaurant is aggregated and/or fact checked.

An augmented reality device is able to be any augmented reality device (e.g., Google Glass®). For example, the augmented reality device includes a camera and a display which are able to be worn on a user's face. The augmented reality device also includes a processor and memory for processing and storing information such as applications and acquired information. The applications are able to perform functions such as face recognition, content recognition (e.g., text recognition), image recognition, and use acquired information with the generating, aggregating, summarizing and/ or fact checking implementations. For example, the camera of the augmented reality device acquires the name of a restaurant by text/image recognition of the data received by the camera, then articles are found using the name of the restaurant, the articles are summarized and fact checked, and the summaries with fact check results are displayed on the display of the augmented reality device.

In some embodiments, headlines are aggregated and fact checked instead of or in addition to entire articles, and links for the full article are provided.

In some embodiments, the generation, aggregation, summarization, and/or fact checking are utilized with a search engine. For example, when a user searches for a search string, a summarization of recent articles related to the search string is automatically generated. Furthering the example, articles/web pages/content are located based on the search string, then a summarization implementation is utilized to consolidate the articles into a summary which is displayed in addition to the search results. In another example, a most recent article/content for the search string is found and automatically fact checked and summarized which is presented with the search results.

In some embodiments, the generation, aggregation, summarization, and/or fact checking utilize email, text messages, social media/networking to post results. For example, aggregated articles that have been fact checked are sent to a user's email periodically.

In some embodiments, any of the steps/methods described herein such as generating, aggregating, summarizing, fact checking, and/or determining opposing perspectives, are able to be implemented utilizing cloud computing. For example, the fact checking is implemented in a cloud computing device and results are sent to user devices. Furthering the example, user devices monitor information, the information is sent to the cloud where it is processed and/or fact checked, and then results are sent to the user devices. In another example, a story is generated, content is aggregated, the aggregated content is summarized and fact checked, all in the cloud, and then content and/or results are distributed to user devices.

The methods described herein are able to be implemented separately or together. For example, content is able to be generated, aggregated, summarized and/or fact checked. Content is able to be fact checked then generated, aggregated and/or summarized. Content is able to be generated, aggregated and/or summarized and then fact checked. Any combination or permutation of the methods is able to be utilized. Any order of the methods is able to be utilized. Any of the methods are able to be utilized multiple times. Any of the methods/steps are able to be performed sequentially or in parallel. The output of any of the methods is able to be used as input of any of the other methods. For example, content is fact checked, and then the fact check results are used to generate a summary, and the summary is used for generating a story. The output of any of the methods is able to be displayed and/or transmitted. The steps/methods are able to be implemented on separate content or collective content. For example, each separate piece of aggregated content is summarized separately to generate multiple summaries, or aggregated content is summarized as one to generate a single summary. In another example, generated content, aggregated content and other content are summarized separately or as one. Fact checking is able to be implemented before and/or after any step or method, and the fact checking is able to be performed on any part of the data. For example, content is aggregated, then summarized and then fact checked (e.g. the aggregated content and the summaries are fact checked, or only the summarized aggregated data is fact checked); or content is aggregated then fact checked and then summarized; or content is fact checked then aggregated and then summarized. Fact checking and/or any of the methods are able to occur multiple times. For example, summary information is fact checked, then aggregating occurs, and then fact checking occurs on the aggregated content.

Examples of methods include: generating content; aggregating content; summarizing content; fact checking content; generating content and aggregating content; generating content and summarizing content; generating content and fact checking content; aggregating content and generating content; summarizing content and generating content; fact checking content and generating content; aggregating content and summarizing content; summarizing content and aggregating content; aggregating content and fact checking content; fact checking content and aggregating content; summarizing content and fact checking content; fact checking content and summarizing content; generating content, aggregating content, and summarizing content; generating content, aggregating content, and fact checking content; generating content, summarizing content, and fact checking content; generating content, summarizing content, and aggregating content; generating content, fact checking content, and aggregating content; generating content, fact checking content, and summarizing content; aggregating content, summarizing content, and fact checking content; aggregating content, generating content, and summarizing content; aggregating content, generating content, and fact checking content; aggregating content, summarizing content, and generating content; aggregating content, fact checking content, and generating content; aggregating content, fact checking content, and summarizing content; summarizing content, aggregating content, and fact checking content; summarizing content, fact checking content, and aggregating content; summarizing content, fact checking content, and generating content; summarizing content, generating content, and fact checking content; summarizing content, generating content, and aggregating content; summarizing content, aggregating content, and generating content; fact checking content, generating content, and aggregating content; fact checking content, generating content, and summarizing content; fact checking content, aggregating content, and generating content; fact checking content, aggregating content, and summarizing content; fact checking content, summarizing content, and generating content; fact checking content, summarizing content, and aggregating content; generating content, aggregating content, fact checking content, and summarizing content; generating content, aggregating content, summarizing content, and fact checking content; generating content, summarizing content, fact checking content, and aggregating content; generating content, fact checking content, summarizing content, and aggregating content; generating content, fact checking content, aggregating content, and summarizing content; aggregating content, summarizing content, generating content, and fact checking content; aggregating content, generating content, fact checking content, and summarizing content; aggregating content, generating content, summarizing content, and fact checking content; aggregating content, summarizing content, fact checking content, and generating content; aggregating content, fact checking content, summarizing content, and generating content; aggregating content, fact checking content, generating content, and summarizing content; summarizing content, aggregating content, generating content, and fact checking content; summarizing content, fact checking content, generating content, and aggregating content; summarizing content, fact checking content, aggregating content, and generating content; summarizing content, generating content, aggregating content, and fact checking content; summarizing content, generating content, fact checking content, and aggregating content; summarizing content, aggregating content, fact checking content, and generating content; fact checking content, generating content, summarizing content, and aggregating content; fact checking content, generating content, aggregating content, and summarizing content; fact checking content, aggregating content, summarizing content, and generating content; fact checking content, aggregating content, generating content, and summarizing content; fact checking content, summarizing content, aggregating content, and generating content; fact checking content, summarizing content, generating content, and aggregating content. The content is able to be the same content and/or different content. For example, if content is generated, that content is able to be summarized and/or different content is summarized. The output of any prior method is able to be the input of a method or not. Other methods are able to be incorporated before or after any of the steps, for example, determining different perspectives. The examples described are not meant to limit the invention in any way.

Additional examples are described herein, but are not meant to limit the invention in any way. For example, an article is generated utilizing database information. Additionally, similar articles (based on topic) are aggregated and fact checked, and only articles with a factual accuracy rating above a threshold are displayed to the user along with the generated article.

For example, an article is generated utilizing web page analysis. Additionally, articles based on the web page analysis are aggregated. Only the aggregated content is fact checked.

For example, articles are aggregated and fact checked, and only the factually accurate aggregated articles are summarized.

For example, articles are aggregated and fact checked, and only the factually accurate aggregated articles are displayed.

For example, several web pages related to a specified topic are located and fact checked, and only the articles with a factual accuracy rating above a threshold are aggregated. Each of the aggregated articles is summarized, and the summaries with the fact checking results are displayed.

For example, social networking content is aggregated and fact checked, and only the social networking content that has a factual accuracy rating above a threshold is summarized.

For example, several articles related to the same topic but with opposing perspectives based on analysis of the authors are located and fact checked, but only the two most factually accurate articles are summarized and merged to generate a new story.

For example, a story is generated, content is aggregated, and additional information is located. The story, content and additional information are summarized. The summary is fact checked, and the fact check results are displayed to a user.

For example, a story is generated using fact checked information. The story is summarized and displayed to a user.

For example, two items of content are summarized and the summaries are fact checked. The fact checked summaries are utilized to generate a story.

For example, multiple web pages are fact checked and summarized, where only the web pages written by entities with a validity rating above a threshold are summarized. The summaries are aggregated and displayed to a user.

For example, tweets by a CEO are fact checked and then summarized using only the factually accurate information of the tweets.

For example, tweets by a CEO are fact checked and then content is generated using only the factually accurate information of the tweets.

For example, summaries of content are aggregated and fact checked, and displayed in order based on their factual accuracy ratings (e.g., most accurate first).

For example, aggregated content is summarized individually or collectively and fact checked.

For example, content is fact checked, and based on the fact check results, articles and/or summaries are generated, and/or the content is aggregated.

For example, content is aggregated and fact checked, and then a story is generated using the fact checked aggregated content.

For example, stories are generated, then aggregated and then fact checked.

For example, aggregated content is summarized, and the summaries are used to generate a story which is fact checked.

For example, content is summarized, the summaries are fact checked, and stories are generated using the summaries by merging only factually accurate content.

For example, only factually accurate content as determined by fact checking is used to generate a story/content. In another example, only the factually accurate content with a confidence score above a threshold is used.

For example, any content except for factually inaccurate content as determined by fact checking is used to generate a story/content.

For example, only sources with a factual accuracy rating above a threshold as determined by fact checking are used to generate a story/content.

For example, only factually inaccurate content as determined by fact checking and a template are used to generate a story/content indicating the content is inaccurate.

For example, only questionable content as determined by fact checking and a template are used to generate a story/content indicating the content is questionable.

For example, factually accurate and factually inaccurate content as determined by fact checking and a template are used to generate a story/content where the template is configured to separate the factually accurate content and the factually inaccurate content.

For example, all content is used to generate a story/content but the story includes indications of factually accurate, factually inaccurate, and/or any other characterizations.

For example, only content with a factual accuracy rating above a threshold as determined by fact checking is aggregated.

For example, only content with a number of factual inaccuracies below a threshold as determined by fact checking is aggregated.

For example, only content with a factual accuracy rating equal to or below a threshold as determined by fact checking is aggregated and is indicated as factually inaccurate.

For example, only questionable content as determined by fact checking is aggregated and is indicated as questionable. For example, the content is not able to be confirmed or disproved.

For example, all types of content are aggregated, and the content is indicated/classified based on fact checking.

For example, only content with a factual accuracy rating above a threshold as determined by fact checking is summarized.

For example, only content with a factual accuracy rating equal to or below a threshold as determined by fact checking is summarized.

For example, only factually accurate content (and/or another characterization) as determined by fact checking is utilized when generating a summary. Furthering the example, lexical chains are generated using only sentences or phrases of factually accurate content. In another example, lexical chains are generated using the entire content, but only factually accurate sentences or phrases are selected when generating the summary.

For example, only factually inaccurate content (and/or another characterization) as determined by fact checking is utilized when generating a summary. Furthering the example, lexical chains are generated using only sentences or phrases of factually inaccurate content. In another example, lexical chains are generated using the entire content, but only factually inaccurate sentences or phrases are selected when generating the summary.

For example, factually accurate content, factually inaccurate content, and/or other characterizations of content as determined by fact checking are utilized when generating two or more summaries (e.g., a summary of factually accurate information and a summary of factually inaccurate information).

For example, all content is fact checked and summarized, and the factual accuracy results are indicated.

For example, only content from an entity with a validity rating above a threshold is used to generate content.

For example, only content from an entity with a validity rating above a threshold is aggregated.

For example, only content from an entity with a validity rating above a threshold is summarized.

For example, only content from an entity with a satisfaction rating above a threshold is used to generate content.

For example, only content from an entity with a satisfaction rating above a threshold is aggregated.

For example, only content from an entity with a satisfaction rating above a threshold is summarized.

For example, factually accurate information as determined by fact checking is used to generate content, only content with a factually accuracy rating above a threshold is aggregated, and additional information is fact checked.

For example, factually accurate information as determined by fact checking is used to generate content, only content with a factually accuracy rating above a threshold is aggregated, which are then summarized, and additional information is fact checked and summarized.

For example, content is aggregated based on a keyword, the aggregated content is fact checked, and only the top 2 items of content based on factual accuracy ratings are summarized and merged.

As described herein, these are merely examples, any combination or permutation of any of the methods/method steps with any combination or permutation of input/output is able to be utilized together.

Figure 12:
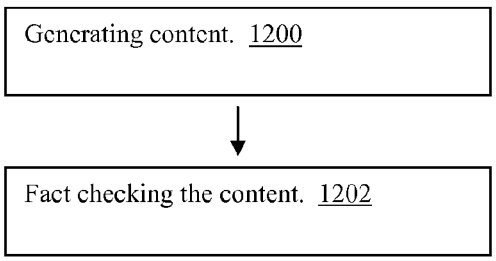
FIG. 12 illustrates a flowchart of a method of generating and fact checking content according to some embodiments.

FIG. 12 illustrates a flowchart of a method of generating and fact checking content according to some embodiments. In the step 1200, content is generated. In the step 1202, the generated content is fact checked. For example, fact check results are displayed with the generated content. In some embodiments, fewer or additional steps are implemented. In some embodiments, the order of the steps is modified.

Figure 13:
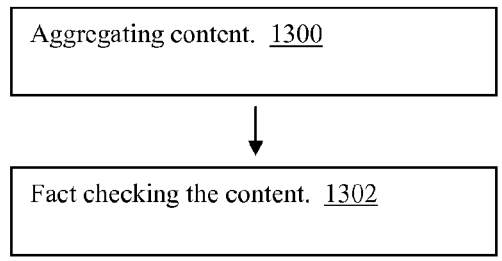
FIG. 13 illustrates a flowchart of a method of aggregating and fact checking content according to some embodiments.

FIG. 13 illustrates a flowchart of a method of aggregating and fact checking content according to some embodiments. In the step 1300, content is aggregated. In the step 1302, the aggregated content is fact checked. For example, the aggregated content is displayed with fact check results. In another example, the aggregated content is sorted/ordered based on the fact check results (e.g., content with highest factual accuracy rating is displayed first). In another example, aggregated content that does not meet a factual accuracy threshold is not displayed. In some embodiments, fewer or additional steps are implemented. In some embodiments, the order of the steps is modified.

Figure 14:
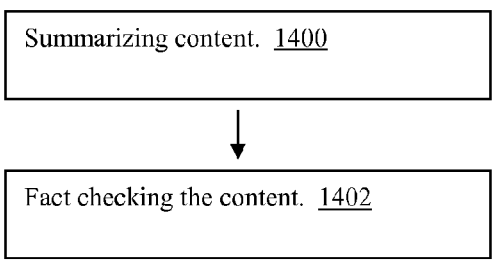
FIG. 14 illustrates a flowchart of a method of summarizing and fact checking content according to some embodiments.

FIG. 14 illustrates a flowchart of a method of summarizing and fact checking content according to some embodiments. In the step 1400, content is summarized. In the step 1402, the summarized content is fact checked. For example, only a summary of the content is fact checked, and results are displayed with the summary. In another example, only the summary is fact checked, but the fact check results are displayed with the entire content. In some embodiments, fewer or additional steps are implemented. In some embodiments, the order of the steps is modified.

Figure 15:
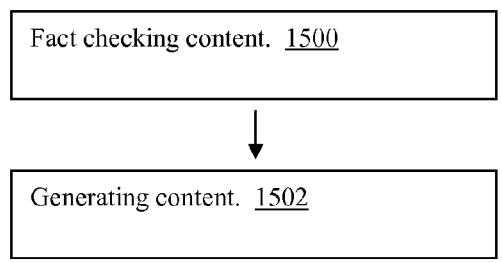
FIG. 15 illustrates a flowchart of a method of fact checking content and generating content according to some embodiments.

FIG. 15 illustrates a flowchart of a method of fact checking content and generating content according to some embodiments. In the step 1500, content is fact checked. In the step 1502, content is generated using the fact check analysis. For example, only factually accurate information is utilized when generating content. In some embodiments, fewer or additional steps are implemented. In some embodiments, the order of the steps is modified.

Figure 16:
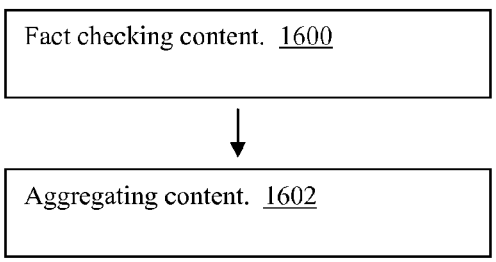
FIG. 16 illustrates a flowchart of a method of fact checking content and aggregating content according to some embodiments.

FIG. 16 illustrates a flowchart of a method of fact checking content and aggregating content according to some embodiments. In the step 1600, content is fact checked. In the step 1602, content is aggregated using the fact check analysis. For example, only content with a factual accuracy rating above a threshold is aggregated. In some embodiments, fewer or additional steps are implemented. In some embodiments, the order of the steps is modified.

Figure 17:
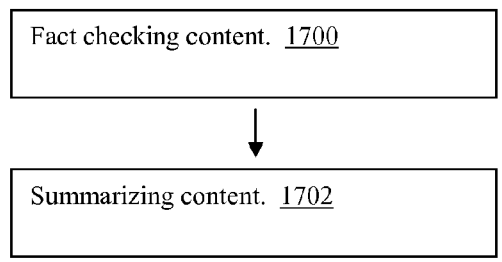
FIG. 17 illustrates a flowchart of a method of fact checking content and summarizing content according to some embodiments.

FIG. 17 illustrates a flowchart of a method of fact checking content and summarizing content according to some embodiments. In the step 1700, content is fact checked. In the step 1702, content is summarized using the fact check analysis. For example, only content with a factual accuracy rating above a threshold is summarized. In another example, the fact checking results are utilized with lexical chaining to generate a summary. In some embodiments, fewer or additional steps are implemented. In some embodiments, the order of the steps is modified.

FIG. 18 illustrates a flowchart of a method of generating, aggregating, summarizing and/or fact checking content according to some embodiments. In the step 1800, content is generated, aggregated, summarized and/or fact checked. In the step 1802, the output of the step 1800 and/or the content and/or other content is utilized for generating, aggregating, summarizing and/or fact checking. In some embodiments, fewer or additional steps are implemented. In some embodiments, the order of the steps is modified.

FIG. 19 illustrates a flowchart of a method of generating, aggregating, summarizing and/or fact checking content according to some embodiments. In the step 1900, content is generated, aggregated, summarized and/or fact checked. In the step 1902, the output of the step 1900 and/or the content and/or other content is utilized for generating, aggregating, summarizing and/or fact checking. In the step 1904, the output of the step 1900 and/or the output of the step 1902 and/or the content and/or other content is utilized for generating, aggregating, summarizing and/or fact checking. In some embodiments, fewer or additional steps are implemented. In some embodiments, the order of the steps is modified.

FIG. 20 illustrates a flowchart of a method of generating, aggregating, summarizing and/or fact checking content according to some embodiments. In the step 2000, content is generated, aggregated, summarized and/or fact checked. In the step 2002, the output of the step 2000 and/or the content and/or other content is utilized for generating, aggregating, summarizing and/or fact checking. In the step 2004, the output of the step 2000 and/or the output of the step 2002 and/or the content and/or other content is utilized for generating, aggregating, summarizing and/or fact checking. In the step 2006, the output of the step 2000 and/or the output of the step 2002 and/or the output of the step 2004 and/or the content and/or other content is utilized for generating, aggregating, summarizing and/or fact checking. In some embodiments, fewer or additional steps are implemented. In some embodiments, the order of the steps is modified.

FIG. 21 illustrates a diagram of implementations usable with or without optimized fact checking according to some embodiments. The implementations include: generating content, aggregating content, merging content, summarizing content, determining opposing perspectives, utilizing validity ratings, utilizing satisfaction ratings, replay, breaking news, utilizing language differences, advertising, incorporating user interests, cloud computing, augmented reality, search, and/or any other implementation. The implementations are able to be utilized separately or together with any of the other implementations.

Figure 22:
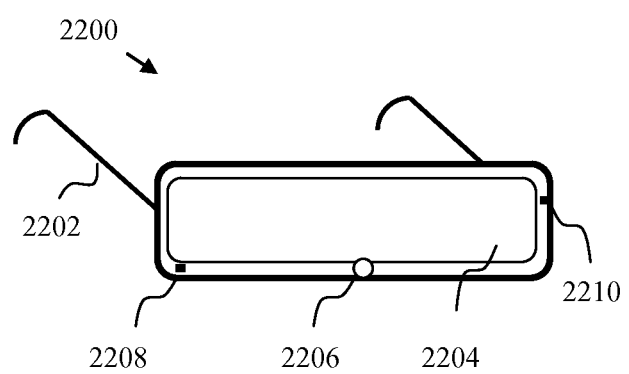
FIG. 22 illustrates a diagram of an augmented reality device according to some embodiments.

FIG. 22 illustrates a diagram of an augmented reality device according to some embodiments. The device 2200 includes a frame 2202, a lens 2204, and a camera 2206. In some embodiments, the lens 2204 or part of the lens 2204 is used as a display or a separate display is able to be included with the device 2200. The camera 2206 is able to acquire visual content by scanning and/or taking a picture of objects. In some embodiments, the camera 2206 is capable of processing the data including converting the content to text, parsing the content, generating content, aggregating content, summarizing content, fact checking the content and/or providing supplemental information, and indicating a result of the fact checking/supplemental information search on the lens 2204 or another location. In some embodiments, the camera 2206 acquires the content, and some or all of the processing, fact checking, searching and/or indicating occurs on another device (e.g., in the cloud). For example, the camera 2206 acquires a restaurant name, sends (using a transceiver/receiver) the content or identifying information to the cloud for converting, parsing, fact checking, and then the could sends the results to the camera 2206 (or directly to the lens 2204) for display on the lens 2204 or elsewhere. In another example, a processor 2208 (and/or any other circuitry/computer components) is also included with the glasses and is coupled to the camera 2206 and lens 2204, and the processor 2208 processes and fact checks the information and sends the result to the lens 2204. The device 2200 is able to include a microphone 2210 for acquiring audio. The device 2200 is able to be any shape or configuration and is not limited to the specific configuration as shown. For example, the frame is able to be any shape, the lens is able to be singular or multiple lenses in any shape, the camera is able to be located anywhere and does not even need to be attached to the frame (e.g., a camera is worn on the user's head, but information is displayed on the lens), or the processor is located elsewhere.

For example, a user wears the augmented reality device 2200 to a political rally. The camera 2206 of the device 2200 uses facial recognition to determine that Politician J is speaking. The microphone 2210 receives what Politician J is saying. The processor 2208 processes the received content and converts it into text. The text is fact checked. In some embodiments, the fact check results are classified (e.g., factually accurate and factually inaccurate). Using the fact checked information, a summary is generated only including factually accurate content. In another example, an article is generated using only factually accurate content. In another example, two articles are generated, one with only factually accurate content, and one with only factually inaccurate content. In some embodiments, the summary or summaries are generated using lexical chaining and/or other summarization implementations. The summary or article generated is displayed on the lens 2204 for the user to read, or the generated content is published such as sent to the Web (e.g., to the user's blog or social networking page or to be published on a media site)

In another example, a user wears the augmented reality device 2200. The camera 2206 of the device 2200 uses text recognition to determine the name of a restaurant (e.g., an image is taken of the name, the image is processed using an application to convert an image into text). For example, the user's augmented reality device 2200 detects Restaurant X, and instead of or in addition to providing a list of Yelp reviews, an automatically generated summary of the Yelp reviews is provided to the user on the lens 2204 of the augmented reality device 2200. In another example, articles about Restaurant X are aggregated and displayed on the lens 2204. In another example, after detecting Restaurant X, the user is able to send social networking messages about the restaurant.

The augmented reality device is able to be any device such as glasses, goggles, ear buds (or another hearing device), a tactile device (e.g., a device to vibrate a part of the user such as finger or ear), and/or any other device to provide augmented reality. For example, augmented reality glasses include a tactile device which vibrates the earpiece near the users ear upon determining a triggering event such as fact checking content and determining it is factually inaccurate. In some embodiments, the augmented reality device includes a microphone to receive audio, and the audio is processed (e.g., converted to text) and fact checked and/or analyzed as described herein. In some embodiments, the augmented reality device includes a projection device or the projection device is the camera or part of the camera. For example, the projection device is able to output any of the results or information onto another object (e.g., wall, paper, table). Any of the steps/methods described herein are able to be implemented using the augmented reality device.

In some embodiments, optimized fact checking includes using a broadening implementation approach. For example, an exact match fact check is implemented. The exact phrase is searched for within source information. If the exact phrase is found in a sufficient number of sources (e.g., above a lower threshold), then a result is returned (e.g., true). If the exact phrase is not found (e.g., equal to or below the lower threshold of sources), then a second fact check implementation is utilized. For example, the second fact check implements a pattern matching search. The pattern matching search is able to be implemented in any manner, for example, pattern matching utilizes subject-verb-object matching to determine if the same or a similar item matches.

If the second fact check returns with sufficient confidence (e.g., number of matches and/or sources above a lower threshold or a pattern matching confidence score above a lower threshold), then a result is returned. If the second fact check does not return with sufficient confidence, then a third fact check is implemented. For example, the third fact check implements a natural language search. If the third fact check returns with sufficient confidence (e.g., above a natural language confidence lower threshold or number of matches above a lower threshold), then a result is returned. If the third fact check does not return with sufficient confidence, then a negative result or some other result is returned, or no result is returned. Although only three fact check implementations are described herein, any number of implementations are able to be implemented and used before returning a negative result.

In some embodiments, optimized fact checking includes using a broadening source approach according to some embodiments. Information to be fact checked is compared with a narrow source. For example, the narrow source is a single database stored on a local device. Other examples of narrow sources are a single document, a single document on a local device, a designated fact checking database or a single web page. If the fact check determines a sufficient result (e.g., information matches or is verified by the narrow source), then a result is returned (e.g., validated). If the fact check does not find a match, then a broader scope of sources is utilized (e.g., many databases stored within a dedicated set of "cloud" devices). If a sufficient result is determined (e.g., a number above a lower threshold of sources agree or disagree with the information to be fact checked), then a result is returned. If the broader fact check does not find a match, then an even broader scope of sources is utilized (e.g., the entire Web). If a sufficient result is determined (e.g., a number above a lower threshold of sources agree or disagree with the information to be fact checked), then a result is returned. If the even broader fact check does not find a match, then a result indicating a negative result, some other result, or no result is indicated. In some embodiments, additional broadening is implemented. In other words, the fact checking is not limited to three rounds of sources.

In some embodiments, optimized fact checking utilizes sources on devices of differing speeds. For example, source information on a local cache is used first, then source information on a Random Access Memory (RAM) is used, then source information on a hard drive is used, and then source information on distributed storage is used last for fact checking. In this example, quicker (meaning faster access times) sources are used first, followed by slower sources if a result is not found. In some embodiments, most recent, most popular, and/or most common quotes/information are stored in the quicker storage (e.g., cache), and the least recent, least popular, least common quotes/information are stored in the slower storage (e.g., distributed storage). In some embodiments, common variants of recent, popular, and/or common information are stored (locally) as well. For example, a similar comment with one or two of the words changed or replaced by synonyms. In some embodiments, only facts are stored in the cache or in devices faster than a hard drive (e.g., cache and RAM). In some embodiments, only facts are stored on faster devices (e.g., a hard drive or faster) and only opinions are stored on slower devices (e.g., distributed source devices). In some embodiments, higher confidence score fact check results are stored on devices with faster access times. For example, if a cache is able to store 1,000 fact check results, the 1,000 fact check results with the highest confidence score are stored in the cache, and the next highest fact check results are stored on RAM, and so on with the lowest confidence score results stored on the slowest devices. In another example, the storage includes varying speeds of servers, hard drives, locations on hard drives, and other data storage devices. For example, the most popular or relevant sources are stored on an extremely fast server, and less popular/relevant sources are stored on a slower server, and even less popular/relevant sources are stored on an even slower server.

In some embodiments, optimized fact checking includes using a keyword-based source approach according to some embodiments. A keyword or keywords (or phrases) are detected in the information. For example, it is detected that a commentator is discussing "global warming" and "taxes." Initially, only source information classified by the keywords "global warming" and "taxes" are utilized for fact checking Instead of looking at all sources to confirm any information, the source information utilized is found in source information classified as related to "global warming" and "taxes." If the comparison using the source information produces a sufficient result, then the result is returned, and the process ends. If the comparison does not produce a result, then, the comparison uses broader sources such as sources that are related to only a single keyword such as "taxes." If that comparison returns a sufficient result, then the process ends. If further comparisons are needed, then the scope of source information broadens again, and sources classified with keywords related to keywords found in the information are used. For example, instead of just using "taxes" and "global warming," sources under classifications of: "economics," "finance," and "weather" are utilized. If a result is found, then the result is returned. In some embodiments, if a result is still not found, the process ends, with a negative result or no result returned, and in some embodiments, further expansion of the sources is implemented.

In some embodiments, the optimized fact checking implementations and/or other implementations are utilized together. For example, an exact match search is implemented on a local cache using only keyword-classified source information before any other comparisons are performed, and the comparisons broaden/narrow from there. Additional examples include: exact match on cache, then exact match on RAM, exact match on hard drive, exact match on other locations, then pattern matching on cache, pattern matching on RAM, pattern matching on other locations, then natural language search on cache, natural language search on RAM, and natural language search on other locations. In another example, an exact match on cache is used first, then a pattern match on cache, then a natural language search on cache, then an exact match on RAM, and so on. Any combination of the efficient searches/fact checking is possible. In some embodiments, the fact checking process continues until a result is found or a timeout is determined (e.g., after 0.5 ms of searching and no result is determined, the process times out).

In some embodiments, the optimized fact checking system (and/or any of the methods described herein) is a smart phone application including, but not limited to, an iPhone®, Droid® or Blackberry® application. In some embodiments, a broadcaster performs the generating, aggregating, summarizing and/or fact checking. In some embodiments, a user's television performs the generating, aggregating, summarizing and/or fact checking. In some embodiments, a user's mobile device performs the generating, aggregating, summarizing and/or fact checking and causes (e.g., sends) the results to be displayed on the user's television and/or another device. In some embodiments, the television sends the fact checking result and/or other content to a smart phone.

Utilizing the optimized fact checking system, method and device depends on the implementation to some extent. In some implementations, a television broadcast uses fact checking to fact check what is said or shown to the viewers, and a mobile application, in some embodiments, uses fact checking to ensure a user provides factually correct information. Other examples include where web pages or social networking content (e.g., tweet or Facebook® page) are processed, fact checked in an optimized manner, and a result is provided. The generating, aggregating, summarizing and/or fact checking is able to be implemented without user intervention. For example, if a user is watching a news program, the generating, aggregating, summarizing and/or fact checking is able to automatically occur and present the appropriate information. In some embodiments, users are able to disable the generating, aggregating, summarizing and/or fact checking if desired. Similarly, if a user implements generating, aggregating, summarizing and/or fact checking on his mobile application, the generating, aggregating, summarizing and/or fact checking occurs automatically. For a news company, the generating, aggregating, summarizing and/or fact checking is also able to be implemented automatically, so that once installed and/or configured, the news company does not need take any additional steps to utilize the generating, aggregating, summarizing and/or fact checking. In some embodiments, the news company is able to take additional steps such as adding sources. In some embodiments, news companies are able to disable the generating, aggregating, summarizing and/or fact checking, and in some embodiments, news companies are not able to disable the generating, aggregating, summarizing and/or fact checking to avoid tampering and manipulation of data. In some embodiments, one or more aspects of the generating, aggregating, summarizing and/or fact checking are performed manually.

In operation, the optimized fact checking system, method and device enable information to be fact checked in real-time and automatically (e.g., without user intervention) in an optimized manner. The monitoring, processing, fact checking and providing of status are each able to occur automatically, without user intervention. Similarly, generating, aggregating, and/or summarizing are able to occur automatically, without user intervention. Results of the fact checking (and/or any methods) are able to be presented nearly instantaneously, so that viewers of the information are able to be sure they are receiving accurate and truthful information. Additionally, the fact checking is able to clarify meaning, tone, context and/or other elements of a comment to assist a user or viewer. By utilizing the speed and breadth of knowledge that comes with automatic, computational fact checking, the shortcomings of human fact checking are greatly overcome. With instantaneous or nearly instantaneous fact checking, viewers will not be confused as to what information is being fact checked since the results are posted instantaneously or nearly instantaneously versus when a fact check is performed by humans and the results are posted minutes later. The rapid fact checking provides a significant advantage over past data analysis implementations. Any of the steps described herein are able to be implemented automatically or manually. Any of the steps described herein are able to be implemented in real-time or non-real-time. The thresholds described herein are able to be determined/ generated in any manner such as user-generated/specified, automatically generated, and/or generated based on empirical data/testing.

The methods, systems, and devices described herein provide many improvements such as automatically generating, aggregating, summarizing and/or fact checking content quickly and in an optimized manner. The improvements also include providing factually accurate content (e.g., by generating a story using fact checked content, aggregating only factually accurate content or only using factually accurate content to generate a summary), providing fact check results to indicate the status of content, and many other improvements. By summarizing, and then generating, aggregating, and/or fact checking, less content is analyzed, thus efficiency is improved. By fact checking then generating, aggregating, and/or summarizing, accurate content or another specific set of content is used, so the output is more accurate and is produced in a more efficient manner, since less content is analyzed. The improvements involve providing data to users more quickly, more efficiently, and more accurately. The improvements are also able to reduce storage space, bandwidth usage, processing burdens, and display screen footprint.

Examples of Implementation Configurations:

Although the monitoring, processing, generating, aggregating, summarizing, and/or, fact checking and indicating are able to occur on any device and in any configuration, these are some specific examples of implementation configurations. Monitoring, processing, generating, aggregating, summarizing, and/or, fact checking and providing all occur on a broadcaster's devices (or other emitters of information including, but not limited to, news stations, radio stations and newspapers). Monitoring, processing and generating, aggregating, summarizing, and/or, fact checking occur on a broadcaster's devices, and providing occurs on an end-user's device. Monitoring and processing occur on a broadcaster's devices, generating, aggregating, summarizing, and/or, fact checking occurs on a broadcaster's devices in conjunction with third-party devices, and providing occurs on an end-user's device. Monitoring occurs on a broadcaster's devices, processing and providing occur on an end-user's device, and generating, aggregating, summarizing, and/or, fact checking occurs on third-party devices. Monitoring, processing, generating, aggregating, summarizing, and/or, fact checking, and providing all occur on third-party devices. Monitoring, processing, generating, aggregating, summarizing, and/or, fact checking, and providing all occur on an end-user's device. Monitoring, processing and generating, aggregating, summarizing, and/or, fact checking occur on a social networking site's device, and providing occurs on an end-user's device. These are only some examples; other implementations are possible. Additionally, supplemental information is able to be monitored for, searched for, processed and/or provided using any of the implementations described herein. Further, generating, aggregating, summarizing and/or fact checking are able to be implemented on any device or any combination of devices.

Fact checking includes checking the factual accuracy and/or correctness of information. The type of fact checking is able to be any form of fact checking such as checking historical correctness/accuracy, geographical correctness/accuracy, mathematical correctness/accuracy, scientific correctness/accuracy, literary correctness/accuracy, objective correctness/accuracy, subjective correctness/accuracy, and/or any other correctness/accuracy. Another way of viewing fact checking includes determining the correctness of a statement of objective reality or an assertion of objective reality. Yet another way of viewing fact checking includes determining whether a statement, segment or phrase is true or false.

Although some implementations and/or embodiments have been described related to specific implementations and/or embodiments, and some aspects/elements/steps of some implementations and/or embodiments have been described related to specific implementations and/or embodiments, any of the aspects/elements/steps, implementations and/or embodiments are applicable to other aspects/elements/steps, implementations and/or embodiments described herein.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of an augmented reality device comprising:
   a. acquiring target information;
   b. processing the target information, including parsing the target information into parsed information;
   c. fact checking, with the augmented reality device, the target information by comparing the parsed information with source information to generate fact checking results;
   d. classifying factually accurate portions of the target information as factually accurate target information and factually inaccurate portions of the target information as factually inaccurate target information based on the fact checking results;
   e. summarizing the factually accurate target information to generate a factually accurate summary, wherein when the target information has not received a number of positive comments above a threshold, then a base number of sentences are utilized to generate the factually accurate summary, and when the target information has received the number of positive comments above the threshold, then the base number of sentences plus an additional number of sentences are utilized to generate the factually accurate summary, wherein the target information includes augmented reality-acquired device information acquired using the augmented reality device, and wherein the summary of the factually accurate target information is displayed on the augmented reality device, further wherein the augmented reality device includes a tactile device configured for vibrating an earpiece near a user's ear upon fact checking the target information; and
   f. providing the factually accurate summary in real-time.

2. The method of claim 1 further comprising summarizing the factually inaccurate target information to generate a factually inaccurate summary, wherein when the target information has not received the number of positive comments above the threshold, then the base number of sentences are utilized to generate the factually inaccurate summary, and when the target information has received the number of positive comments above the threshold, then the base number of sentences plus the additional number of sentences are utilized to generate the factually inaccurate summary.

3. The method of claim 1 wherein summarizing the factually accurate target information utilizes lexical chaining and the fact checking results generated by fact checking the target information, including determining lexical chain strengths, wherein a total strength of a sentence is based on a lexical chain strength and a factual accuracy of the sentence, further wherein the total strength of the sentence is increased when the sentence is factually accurate, and the total strength of the sentence is decreased when the sentence is factually inaccurate.

4. The method of claim 1 wherein summarizing the factually accurate target information utilizes social networking information of a user to determine a focus of the target information, wherein the user is provided the factually accurate summary.

5. The method of claim 1 wherein summarizing the factually accurate target information includes determining a set of most factually accurate sentences combined with lexical chaining to generate the factually accurate summary.

6. The method of claim 1 further comprising generating advertisement information based on the factually accurate summary, further wherein keywords of a lexical chain are analyzed to generate the advertisement information.

7. The method of claim 1 wherein the target information comprises aggregate information aggregated by utilizing a web crawler to search for and retrieve content to generate the aggregate information, further comprising modifying the aggregate information to generate modified aggregate information by deleting sentences containing factually inaccurate content in the aggregate information as determined by fact checking.

8. The method of claim 1 wherein the target information comprises aggregate information aggregated by utilizing a web crawler to search for and retrieve content to generate the aggregate information, wherein the aggregate information includes a plurality of articles and each article of the plurality of articles includes a plurality of sentences, wherein when a sentence is determined to be factually accurate based on fact checking and relevant to a summary based on lexical chaining, then the sentence is utilized when generating the summary, and when the sentence is determined to be factually inaccurate based on fact checking and relevant to the summary based on lexical chaining, then the sentence is not utilized when generating the summary, and when the sentence is determined to be factually accurate based on fact checking and not relevant to the summary based on lexical chaining, then the sentence is not utilized when generating the summary, and when the sentence is determined to be factually inaccurate based on fact checking and not relevant to the summary based on lexical chaining, then the sentence is not utilized when generating the summary.

9. The method of claim 1 wherein the target information comprises aggregate information aggregated by utilizing a web crawler to search for and retrieve content to generate the aggregate information, wherein the aggregate information includes a plurality of articles, and each article of the plurality of articles receives a factual accuracy rating based on fact checking, further wherein an article of the plurality of articles with a lowest factual accuracy rating is summarized with no additional sentences, and articles with higher factual accuracy ratings are summarized with the additional sentences such that the article with the highest factual accuracy rating is summarized with the base number of sentences plus a maximum number of additional sentences.

10. The method of claim 1 wherein providing the factually accurate summary includes displaying selectable tiles, wherein selecting a tile of the selectable tiles causes a full content item to be displayed at a location of a sentence corresponding to the tile with the sentence highlighted.

11. The method of claim 1 wherein summarizing the factually accurate target information utilizes two different summarizing implementations to generate two different summaries, and comparing the two different summaries.

12. The method of claim 1 further comprising analyzing social networking information of a user, determining interests of the user based on analyzing the social networking information, storing the interests of the user in a data structure, and summarizing the factually accurate target information utilizing the interests stored in the data structure by increasing a lexical chain strength if a word in a lexical chain matches the word in the data structure, wherein the user is provided the factually accurate summary.

13. The method of claim 1 wherein when a size of the factually accurate summary is below a threshold, then summarizing the target information including the factually accurate target information and the factually inaccurate target information to generate a target summary, and providing the target summary.

14. The method of claim 1 further comprising merging multiple content items with disparate views into a merged content item, including maintaining a relative position of each sentence when merging the multiple content items, wherein the target information comprises the merged content item.

15. The method of claim 1 wherein summarizing the factually accurate target information includes analyzing a validity rating of an entity who provided the target information, wherein the validity rating is based on factual accuracy of content provided by the entity, and when the validity rating of the entity is below a first threshold, no additional sentences are used for summarizing the factually accurate target information, and when the validity rating of the entity is equal to or above the first threshold and below a second threshold, a first number of additional sentences are used for summarizing the factually accurate target information, and when the validity rating of the entity is equal to or above the second threshold, a second number of additional sentences are used for summarizing the factually accurate target information.

16. The method of claim 1 wherein the target information includes one or more data sources with opposing perspectives, wherein the one or more data sources comprise a first data source with a first opposing perspective, and the one or more data sources comprise a second data source with a second opposing perspective.

17. The method of claim 1 wherein the target information comprises aggregate information which comprises a plurality of articles about a same topic determined by comparing dates and matching keywords within the plurality of articles.

18. The method of claim 1 wherein the tactile device of the augmented reality device is configured for vibrating the earpiece near the user's ear when the target information is determined to be factually inaccurate.

19. A method programmed in a non-transitory memory of an augmented reality device comprising:
 a. acquiring target information, wherein the target information comprises information contributed by a user through a social networking site;
 b. processing the target information, including parsing the target information into parsed information;
 c. fact checking, with the augmented reality device, the target information by comparing the parsed information with source information to generate fact checking results;
 d. classifying factually accurate portions of the target information as factually accurate target information, classifying factually inaccurate portions of the target information as factually inaccurate target information, and classifying questionable portions of the target information as questionable target information based on the fact checking results;
 e. summarizing the target information to generate a summary utilizing lexical chaining, further wherein when a sentence is identified as a strong lexical chain, a total sentence strength for the sentence is increased, wherein when the sentence is classified as factually accurate, the total sentence strength for the sentence is increased, wherein when the sentence is classified as factually inaccurate, the total sentence strength for the sentence is decreased, and wherein when the sentence is classified as questionable, the total sentence strength for the sentence is not changed, wherein the target information includes augmented reality-acquired device information acquired using the augmented reality device, and wherein the summary of the factually accurate target information is displayed on the augmented reality device, further wherein the augmented reality device includes a tactile device configured for vibrating an earpiece near a user's ear upon fact checking the target information; and
 f. providing the summary in real-time.

20. An augmented reality device comprising:
 a. a non-transitory memory for storing an application for automatically performing the following steps:
  i. acquiring target information;
  ii. processing the target information, including parsing the target information into parsed information;
  iii. fact checking, with the device, the target information by comparing the parsed information with source information to generate fact checking results;
  iv. classifying factually accurate portions of the target information as factually accurate target information and factually inaccurate portions of the target information as factually inaccurate target information based on the fact checking results;
  v. summarizing the factually accurate target information to generate a factually accurate summary, wherein when the target information has not received a number of positive comments above a threshold, then a base number of sentences are utilized to generate the factually accurate summary, and when the target information has received the number of positive comments above the threshold, then the base number of sentences plus an additional number of sentences are utilized to generate the factually accurate summary;
  vi. summarizing the factually inaccurate target information to generate a factually inaccurate summary, wherein when the target information has not received the number of positive comments above the threshold, then the base number of sentences are utilized to generate the factually inaccurate summary, and when the target information has received the number of positive comments above the threshold, then the base number of sentences plus the additional number of sentences are utilized to generate the factually inaccurate summary; and vii. providing the factually accurate summary and the factually inaccurate summary in real-time;
b. a processor for processing the application; and
c. a tactile device configured for vibrating an earpiece near a user's ear upon fact checking the target information, wherein the target information includes augmented reality-acquired device information acquired using the augmented reality device, and wherein the summary of the factually accurate target information is displayed on the augmented reality device.

* * * * *